US005422552A

United States Patent [19]

Parisi

[11] Patent Number: 5,422,552

[45] Date of Patent: Jun. 6, 1995

[54] AUTOMATED ACTUATOR FOR SLIDING PANELS

[76] Inventor: Gary Parisi, 23 Southward Ave., Congers, N.Y. 10920

[21] Appl. No.: 261,840

[22] Filed: Jun. 17, 1994

[51] Int. Cl.$^6$ .................... G05B 5/00

[52] U.S. Cl. .................... 318/466; 318/16; 318/446; 49/31; 49/140; 49/360; 49/404

[58] Field of Search .................... 318/16, 560, 626, 280, 318/281, 283, 286, 445, 446, 452–454, 466–468; 49/13–14, 26, 28, 29–30, 31, 139–140, 163, 120, 302, 348–349, 352, 357, 360–362, 404, 413

[56] References Cited

U.S. PATENT DOCUMENTS

| | | | |
|---|---|---|---|
| 2,334,981 | 11/1943 | Ackley | 268/53 |
| 3,403,474 | 10/1968 | Spasoff | 49/360 |
| 3,533,188 | 10/1970 | Jones et al. | 49/360 |
| 3,621,349 | 11/1971 | Reyx | 49/360 X |
| 3,851,125 | 11/1974 | Deming et al. | 318/468 X |
| 3,890,744 | 6/1975 | Oasis | 49/360 |
| 3,981,203 | 9/1976 | Williams | 74/25 |
| 4,050,189 | 9/1977 | Peterson | 49/26 |
| 4,067,144 | 1/1978 | Ogishi | 49/360 |
| 4,272,921 | 6/1981 | Jorgenson | 49/30 |
| 4,322,913 | 4/1982 | Himmer | 49/168 |
| 4,336,670 | 6/1982 | Brutosky | 49/409 |
| 4,410,843 | 10/1983 | Sauer et al. | 318/466 X |
| 4,496,942 | 1/1985 | Matsuoka . | |
| 4,541,202 | 9/1985 | Dockery | 49/362 |
| 4,577,577 | 3/1986 | Erikkson | 114/128 |
| 4,604,826 | 8/1986 | Sorber | 49/31 |
| 4,621,452 | 11/1986 | Deeg | 49/28 |
| 4,823,010 | 4/1989 | Kornbrekke et al. | 250/341 |
| 4,831,314 | 5/1989 | Tanaka et al. | 318/452 X |
| 4,866,881 | 9/1989 | Morrow et al. | 49/25 |
| 4,885,872 | 12/1989 | Chang et al. | 49/362 |
| 4,891,911 | 1/1990 | Yung | 49/404 |
| 4,893,435 | 1/1990 | Shalit | 49/360 |
| 5,039,925 | 8/1991 | Schap | 318/466 X |
| 5,127,190 | 7/1992 | Hein et al. | 49/360 X |
| 5,191,268 | 3/1993 | Duhame | 318/467 X |
| 5,247,763 | 9/1993 | Hein | 49/360 X |

OTHER PUBLICATIONS

Horton Automatics, 11-81, Reprint 1988, Technical Data Light Duty Sliding Door Operator Series 8700.

*Primary Examiner*—David S. Martin
*Attorney, Agent, or Firm*—Weingram & Zall

[57] ABSTRACT

An automated actuator is fabricated in kit form and adapted to be assembled and disassembled for use with sliding doors, windows or other similar panels. The actuator includes a support column which is adjustable to be braced at the existing door jamb at either side of the door frame to move the panel. Mounting of the actuator does not require the surrounding frame or wall structure to be structurally altered. Circuitry for the actuator ceases the sliding movement of the door when the door meets resistance, such as by a child or animal in the path of the door, and re-tests for the resistance to determine whether the door should continue along the intended path.

24 Claims, 18 Drawing Sheets

AUTOMATED ACTUATOR FOR SLIDING PANELS

BACKGROUND OF THE INVENTION

1. Field of the Invention

The present invention relates to devices that actuate sliding panels such as doors, windows and the like and, in particular, to those devices that are automated and removably mountable to the frame of the sliding panel without altering the frame, the surrounding wall structure or the floor.

2. Background of the Invention

Use of automated devices to open and close sliding doors, windows, or gates are known. See for example, U.S. Pat. Nos. 2,334,981 to Ackley, 3,403,474 to Spassoff, 3,533,188 to Jones et al., 3,890,744 to Galis, 3,981,203 to Williams, 4,050,189 to Peterson, 4,067,144 to Ogishi, 4,272,921 to Jorgensen, 4,322,913 to Himmer, 4,336,670 to Brutosky, 4,541,202 to Dockery, 4,577,577 to Eriksson, 4,604,826 to Sorbe, 4,885,872 to Chang et al., 4,891,111 to Yung, 4,893,435 to Shalit and The Horton Automatics publication having a 1988 reprint date.

U.S. Pat. No. 3,890,744 to Galis discloses a floor mounted apparatus for operating a sliding door. The apparatus includes a housing affixed to the floor with screws. An endless belt disposed within the housing includes a plate which extends from the housing to coact with a bracket affixed to the sliding door by screws.

U.S. Pat. No. 4,541,202 to Dockery discloses an apparatus for operating a sliding door by employing a pair of elongated bars. An end of one bar is secured to a stationery structure adjacent the door by bolts and an adjustable connection at an end of the other bar is secured to the sliding door frame by bolts.

U.S. Pat. No. 4,893,435 to Shalit discloses a device for automatically opening a sliding door and includes a housing attached by screws to the floor across the full width of the door. An endless belt disposed within the housing is attached to the sliding door at the lower portion thereof with a bracket. The bracket includes a plate having pressure-sensitive adhesive on both sides for attaching the plate to a select position on the door.

Sensing devices to control a sliding door are also known and are described in U.S. Pat. Nos. 4,621,452 to Deeg, 4,823,010 to Kornbrekke and 4,866,881 to Morrow et al.

The devices discussed above require, in most instances, intricate wiring and assembly steps for installation at a desired location for operation. In addition, all of the devices require that the door frame, and sometimes the sill or jamb, or surrounding wall area, be structurally altered for the devices to be mounted for operation.

When the known devices are removed from their original mounting, one or more of the surrounding wall area, frame, jamb or sill exhibit holes that were required to mount each device. If it is required that the device be remounted for operation, more than likely the existing holes and altered areas of the surrounding wall structure would have to be rebuilt or filled so that the devices could be retrofitted to the existing door frame assembly or wall structure for operation.

For example, U.S. Pat. Nos. 3,890,744, 4,541,202 and 4,893,435 require, in their respective applications, that the door frame or surrounding wall structure be breached when mounting the operator device for operation. U.S. Pat. No. 4,541,202 to Dockery requires that the door frame and surrounding wall structure be breached to mount the operator, despite disclosing that related devices require substantial reconstruction of the mounting track and surrounding structure. In this regard, Dockery has not really solved the problem identified of having a removably mountable sliding door operator that is retrofitable without altering the wall structure.

The known devices also rely on the structural integrity of the surrounding wall or door frame for mounting purposes, and consequently, these areas must be strong enough to support the known devices and withstand any structural alteration that may be required to mount the known devices.

The known devices also consist of many parts and in some cases, intricate electrical wiring and hydraulic systems which for the most part restrict their mounting to those individuals knowledgeable with the mounting requirements for these type of devices. Because of their complicated structure, the known devices do not lend themselves well to kit form for assembly and disassembly, storage and transport.

The devices disclosed in the Galis, Dockery and Shalit patents have the added disadvantage of being mounted such that they represent an obstacle to be avoided at or near the passageway provided by the sliding door.

OBJECTS AND SUMMARY OF THE INVENTION

It is therefore an object of the present invention to provide an automated actuator device to open and close a sliding panel, the device being manufactured in kit form to facilitate assembly and disassembly without tools, storage and transport. The sliding panel may be a door, window or the like, although by way of example, discussion of the present invention will be with respect to a sliding door.

It is another object of the present invention to provide an actuator device that is removably mountable at existing door jambs and door frames and adjustable thereto without altering the structure of the jamb, frame, wall area or floor.

It is still another object of the present invention to provide a device which actuates a sliding panel that is adapted to be moved, for example, from left to right or from right to left to control access through a passageway.

It is still another object of the present invention to provide a device which is positionable at the jamb of the door frame and which does not obstruct passage or the view through the door.

It is still another object of the present invention to provide a device which does not rely on the integrity of the surrounding wall structure for the device to be securely mounted to actuate the sliding door.

It is still another object of the present invention to provide a device which can be removably mounted to actuate a pocket door assembly.

It is still another object of the present invention to provide a device which ceases the sliding movement of the door when the door meets resistance and permits the door to be immediately engaged for movement after the resistance is no longer present.

It is still another object of the present invention to provide a device which senses the resistance at a drive means for the device to determine whether movement of the sliding door should continue.

It is still another object of the present invention to provide a device which is actuated by wireless transmission, proximity switches or motion detection devices either individually or in combination with each other.

All of the foregoing objects are achieved by the present invention which provides an automated actuator consisting of an apparatus for actuating a panel slidably mounted to open and close a passageway. The apparatus includes a support member having a first end and a second end, and preferably, a first assembly removably mounted to the first end of the support member and adapted to adjust the length of the support member for being braced at a side of the passageway. A second assembly is removably mounted to the support member and includes a drive mechanism. A third assembly is removably mounted to the second end of the support member and is adapted to move the panel between an open and close position to control access through the passageway. The third assembly includes an endless flexible member and opposed end portions, one of the opposed end portions being adapted to be removably mounted to and coact with the second assembly for the drive mechanism to engage the endless flexible member, while the other one of the opposed end portions extends to a position adjacent the panel to be actuated. A coupling assembly disengagingly couples the endless flexible member of the third assembly with the panel. The coupling assembly includes a first coupling member mounted to the endless flexible member, and a second coupling member removably mounted to the panel. The first and second coupling members are adapted for releasable engagement with each other.

BRIEF DESCRIPTION OF THE DRAWINGS

For a more complete understanding of the present invention, reference may be had to the following description of exemplary embodiments of the present invention considered in connection with the accompanying drawings, in which.

DETAILED DESCRIPTION OF THE PREFERRED EMBODIMENTS

Figure 1:
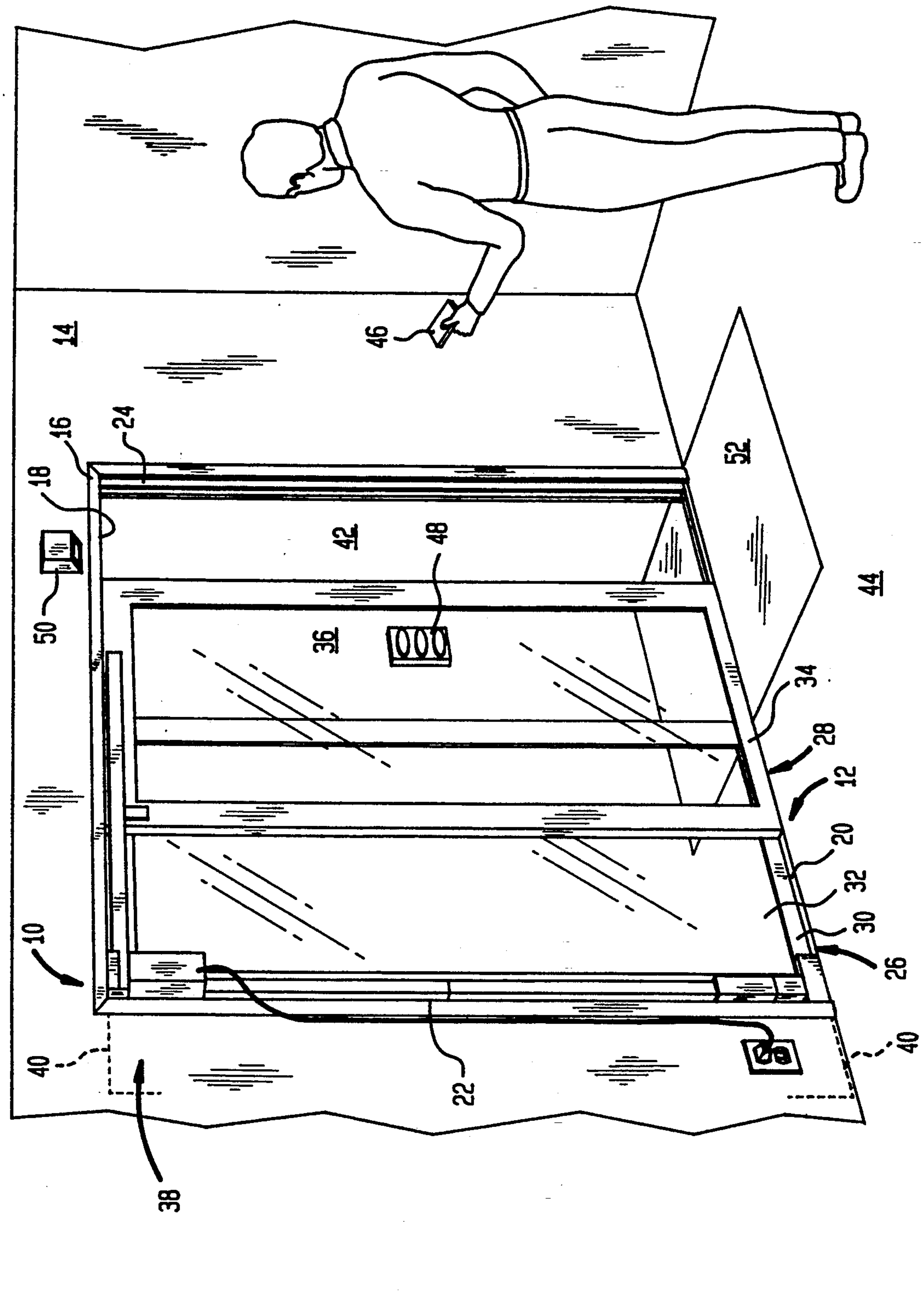
FIG. 1 is a perspective view of a preferred embodiment of the automated actuator of the present invention mounted to actuate a sliding panel such as a sliding door.

Referring to the drawings, where like elements of the present invention are identified by similar reference characters, in FIG. 1 an automated actuator 10 of the present invention is shown mounted at a sliding door assembly 12 in a wall structure 14 of a room. The sliding door assembly 12 is used to control ingress and egress between the room and a backyard, patio, another room, etc.

The sliding door assembly 12 is conventional and includes a door frame 16 having an upper track 18, a lower track 20 and opposed door jambs 22,24. A pair of door panels 26,28 are mounted within the door frame 16 between the upper track 18 and the lower track 20. The door panel 26 includes a frame 30 and a glass pane 32 and the door panel 28 includes a frame 34 and a glass pane 36. The door panel 26 is stationery, while the door panel 28 moves between closed and open positions along the tracks 18,20 to control the passageway between, for example the room and an exterior of the house.

A portion 38 of the wall structure 14 at one side of the door frame 16 may be formed with a pocket area partially represented by broken lines 40. The pocket area 40 is used where the actuator 10 and a substantial portion, if not all of the door panel 28 are to be recessed in the portion 38 of the wall structure, thereby permitting maximum use of the passageway 42, e.g. when wheel chairs are used or in warehouse applications.

The actuator 10 of the present invention controls the horizontal movement of the sliding panel 28. By way of example, the actuator 10 is adapted to be disposed at the door jamb 22 between the upper track 18 and the lower track 20 so that it is substantially hidden from view from the outside of the house and unobtrusive from the inside of the room. In addition, the actuator 10 does not obstruct the floor 44 adjacent the sliding door assembly 12 and the passageway 42.

The actuator 10 is triggered from the inside or outside of the house by a hand-held radio transmitting device 46, although other devices may be used, such as a bump switch 48 mounted to the inside and/or outside of the panel 28, a motion detection device 50 mounted adjacent the sliding door assembly 12, or a proximity switch 52 disposed on the floor 44 as a mat positioned in front of the passageway 42. These devices may be used individually or in combination with each other.

Figure 2:
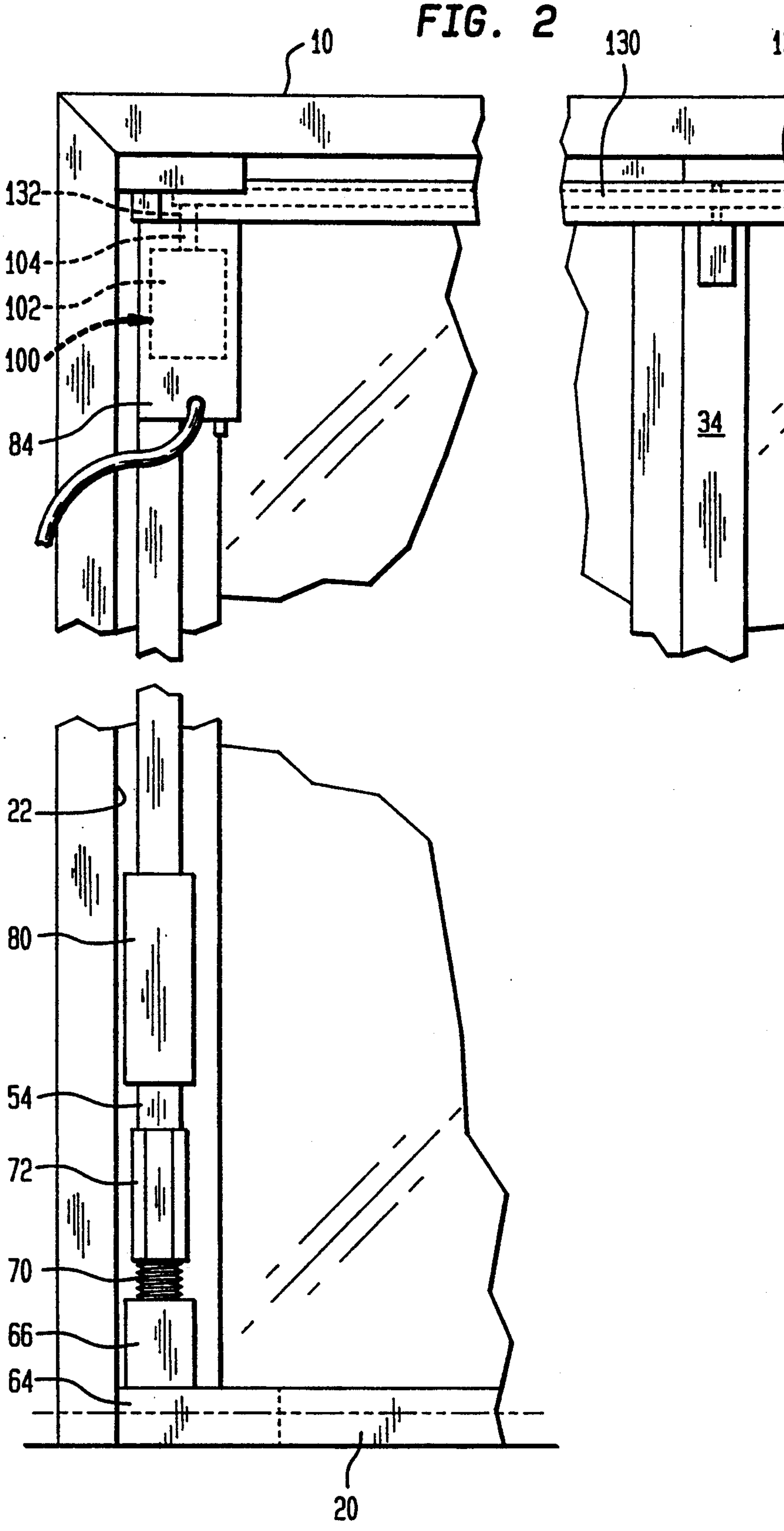
FIG. 2 is a fragmentary elevational view of the automated actuator in FIG. 1 mounted at the door frame to actuate the sliding door.

Referring also to FIG. 2, the actuator 10 is shown disposed between the upper track 18 and the lower track 20 of the door frame 16 and positioned with respect to the door jamb 22. The actuator 10 is adapted to be disposed for operation at either one of the door jambs 22,24. The actuator 10 is removably mounted to the door frame 16 at a side opposite to where the sliding panel 28 is positioned for closing off the passageway 42.

Figure 3:
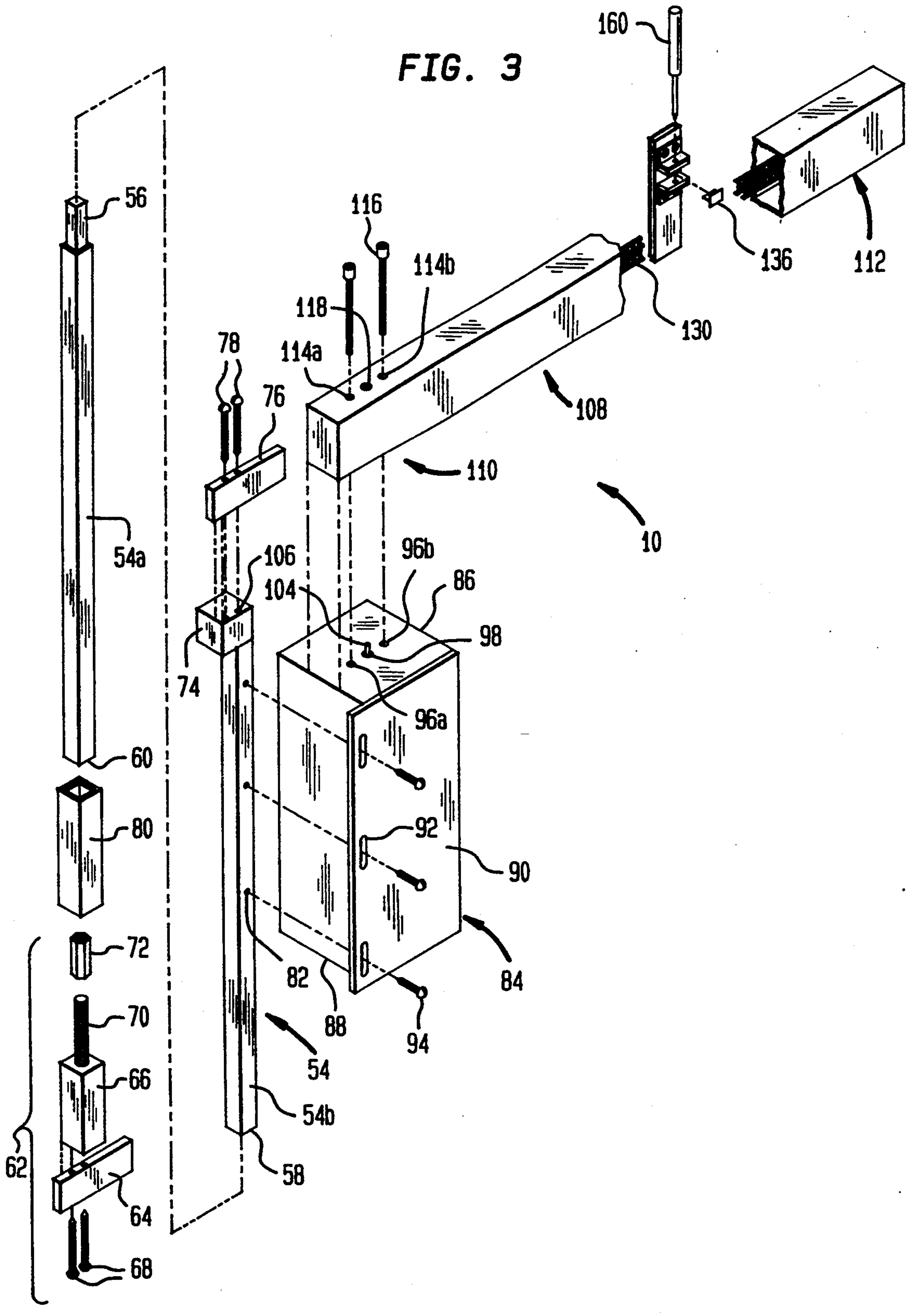
FIG. 3 is an exploded view of the elements of the automated actuator including a drive assembly housing for the actuator.

In FIG. 3 the elements of the actuator 10 are shown. The actuator 10 of the present invention includes a longitudinal member 54 as a support column which is preferably formed as a single continuous piece to provide rigidity and added support for the actuator 10.

Alternatively, the support column 54 is formed as a plurality of interlocking columnar sections 54*a*,54*b* to be assembled for mounting and disassembled for storage and transport. When the support column 54 is assembled from two or more columnar interlocking sections 54*a*,54*b*, an end 56 of one of the sections 54*a* will have a reduced diameter for being inserted into a receiving end 58 of the section 54*b* for a snug friction fit. The support column 54 is adapted for use in any position such as when being used with six or eight foot doorways, which is the size frequently used for residential and commercial buildings. However, the actuator 10 can be used with larger doorways by merely extending the length of the support column 54. A lower end 60 of the support column 54 is adapted to receive an assembly 62 for adjusting the length and therefore the height of the support column 54 with respect to the door jamb 22 and the upper and lower tracks FIG. 3 shows the assembly 62 to include a lower support plate 64 or shoe which is sized and shaped to fit into the lower track 20 of the door frame 16 as shown in FIGS. 1 and 2. In particular, as shown in FIG. 2, the lower support plate 64 when disposed in the lower track 20 is substantially hidden from view. A support block 66 is connected to the lower support plate 64 by mechanical fasteners 68 such as screws. Preferably, thumb screws can be used to obviate the need for tools to attach the support block 66 to the lower support plate 64. A threaded stud 70 or bolt extends from the support block 66 to be received in the lower end 60 of the support column 54. A hex nut 72 is disposed for threaded engagement along the stud 70. The hex nut 72 is adjusted along the stud 70 to regulate the amount of threaded portion of the stud 70 that is to be inserted into the lower end 60 of the support column 54 before the lower end 60 abuts against the hex nut 72. With this arrangement, the length of the support column 54 can be selectively adjusted to and maintained at a desired length to be securely braced along the door jamb 22 between the upper and lower tracks 18,20. A sleeve 80 is internally sized and shaped for sliding movement along the support column 54 to abut the support block 66. The sleeve 80 conceals the threaded stud 70 and the hex nut 72 so that the support column 54 has a streamlined, uniform appearance as shown in FIG.1. An upper end 74 of the support column 54 is provided with an upper support plate 76 or shoe which is connected to the support column 54 with mechanical fasteners 78.

The upper end 74 of the support column 54 is provided with a plurality of apertures 82 to receive a motor housing 84. The motor housing 84 includes an upper end 86, a lower end 88 and at least one side wall 90 provided with apertures 92 through which mechanical fasteners 94 such as screws can be inserted for receipt in a corresponding one of the tapped apertures 82 at the upper end 74 of the support column 54. The upper end 86 of the motor housing 84 is provided with mounting-apertures 96*a*,96*b* between which is disposed another aperture 98, the purpose of which will be described hereinafter.

A drive assembly is disposed within the motor housing 84 as represented by the broken line 100 in FIG. 2. The drive assembly 100 includes a motor 102 and motor shaft 104. The motor shaft 104 extends from the motor housing 84 through the aperture 98.

Figure 3A:
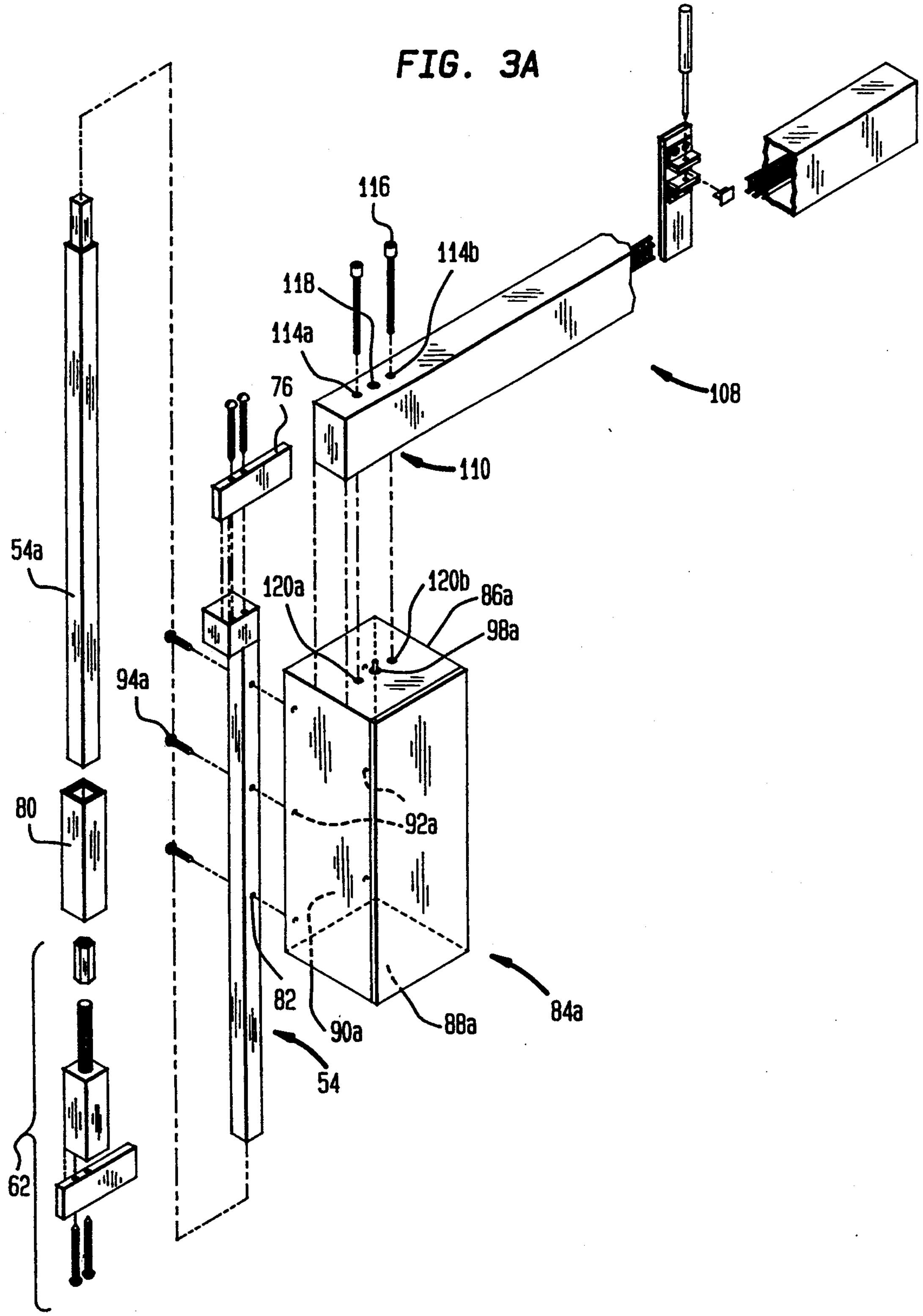
FIG. 3A is the exploded view of the elements shown in FIG. 3 and includes a second embodiment of a drive assembly housing for the actuator.

In FIG. 3A, an alternative embodiment of the motor housing is shown at 84*a*. The motor housing 84*a* includes an upper end 86*a*, a lower end 88*a* and at least one side wall 90*a* facing the support column 54 and which is provided with a plurality of apertures 92*a*. Mechanical fasteners 94*a* such as screws are inserted through the apertures 82 at the upper end 74 of the support column 54 and into the apertures 92*a* of the motor housing 84*a*. The apertures 92*a* are arranged in two parallel rows along the sidewall 90*a*. By way of example, each row includes three apertures 92*a* but it will be understood that a different number of apertures can be employed to secure the motor housing 84*a* to the support column 54. By having two separate rows of apertures along the sidewall 90*a* of the motor housing 84*a*, during assembly of the actuator 10 the motor housing 84*a* can be secured to the support column 54 at a select position. In this manner, the motor housing 84*a* can be mounted to the support column 54 so that it is substantially unobtrusive when being viewed from the outside of the room. The upper end 86*a* of the motor housing 84*a* is provided with mounting apertures 120*a*,120*b* between which is disposed another aperture 98*a*.

The motor housing 84*a* is also adapted to house the drive assembly 100. The motor shaft 104 of the motor 102 extends from the motor housing 84 through the aperture 98.

The upper end 74 of the support column 54 is provided with apertures 106 to receive the upper support plate 76 and a second housing 108, which extends horizontally to be secured to the panel 28. An end 110 of the horizontal housing 108 includes apertures 114*a*,114*b* which extend through the housing 108 and are in registration with the apertures 96*a*,96*b* of the motor housing 84. Mechanical fasteners 116, such as thumb screws, join the end 110 of the horizontal housing 108 to the motor housing 84. The end 110 of the housing 108 also includes an aperture 118 which extends through the housing 108 between the aperture 114*a*,114*b* and is in registration with the aperture 98 of the motor housing 84 to receive the motor shaft 104. The opposite end 112 of the horizontal housing 108 extends to a position adjacent the sliding panel 28. The horizontal housing 108 can be flipped over so that the end 112 of the housing 108 faces the opposite direction while the apertures 114*a*,114*b*,118 are still maintained in registration with the apertures 96*a*,96*b*,98 of the motor housing 84.

The arrangement of the apertures 114*a*,114*b*,118 and their extension through the end 110 of the horizontal housing 108 permits the housing 108 to be used regardless of the side of the door frame to which the actuator 10 is to be mounted. That is, by way of example and referring also to FIG. 1, if the actuator 10 is to be removed from the door jamb 22 to the opposite door jamb 24, this simply requires that the horizontal housing 108 shown in FIG. 3 be flipped-over to extend in a direction opposite to that shown, while the apertures 114*a*,114*b*,118 would still be maintained in registration with the apertures of the motor housing 84. In the example given, after the horizontal housing 108 is flipped over, the aperture 114*a* would be in registration with the aperture 96*b*, the aperture 114*b* would be in registration with the aperture 96*a*, and the aperture 118 would still be in registration with the aperture 98.

A similar mounting arrangement is available with use of the motor housing 84*a* and another embodiment 84*b* of the motor housing discussed hereinafter with reference to FIG. 5.

Figure 4:
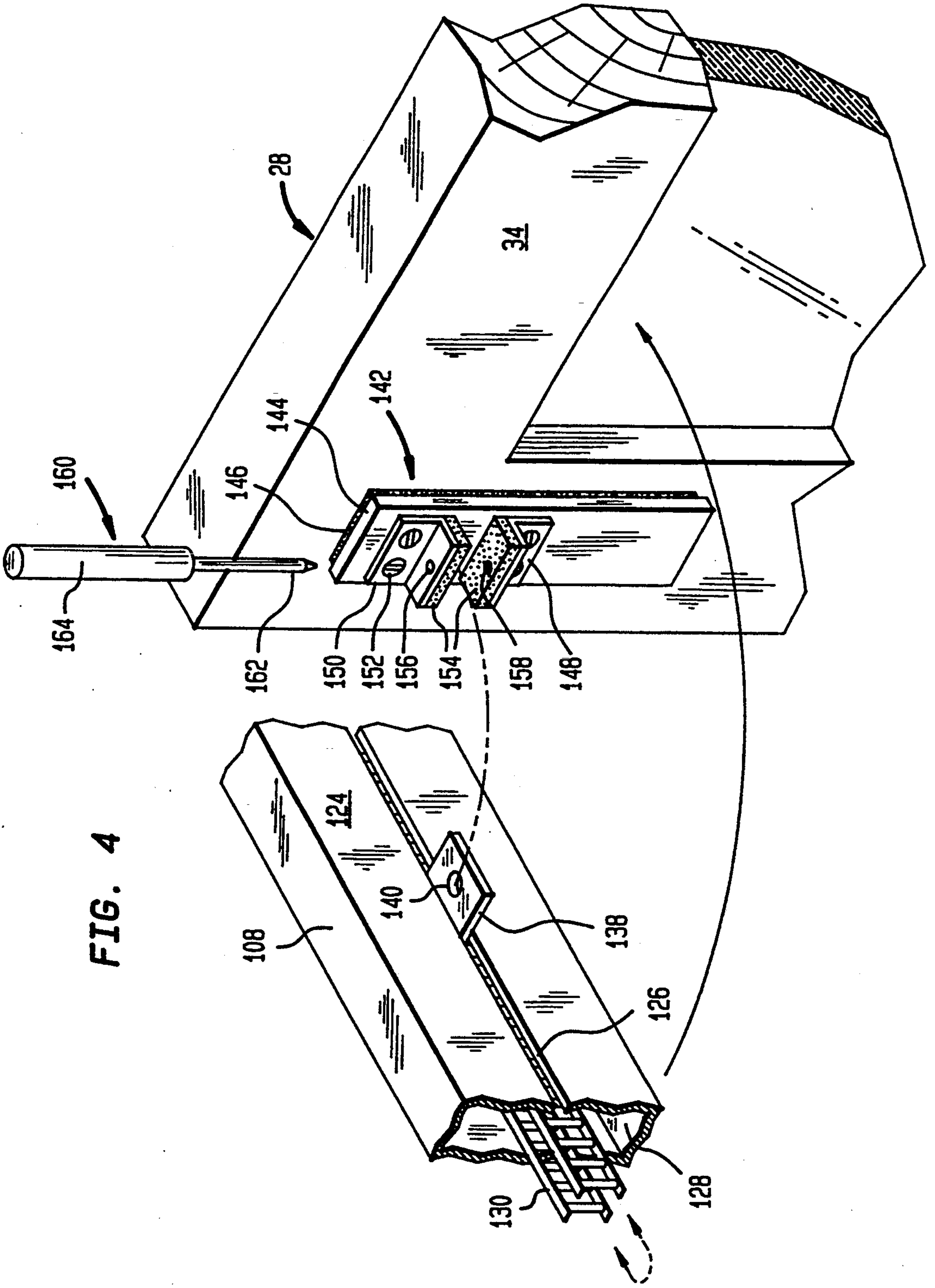
FIG. 4 is a perspective fragmentary view showing means for disengagingly securing the automated actuator to the sliding door for activation.

Referring to FIG. 4, the horizontal housing 108 is more clearly shown as are the elements to removably mount the horizontal housing 108 to the frame 34 of the sliding panel 28. A side 124 of the horizontal housing 108 faces the sliding panel 28 and is formed with a channel 126 which extends through to the interior 128 of the housing. Accordingly, the channel 126 faces the frame 34 of the sliding panel 28. A continuous flexible member such as a belt or chain 130 is disposed at the interior 128 of the horizontal housing 108 and is guided around pulleys 132,134 as shown in FIG. 2. The pulley 132, functions as a drive pulley for the chain 130. The drive pulley 132 is positioned at the aperture 118 and is in registration with the upper end 86 of the motor housing 84 for being driven by the motor shaft 104. The pulley 134 is free-spinning to function as an idler pulley. The chain 130 forms a continuous loop and moves in the direction of arrow A.

Referring to FIGS. 3 and 4, a bracket 136 (FIG. 3) is attached to the chain 130 and includes a flange 138 formed with an aperture 140 extending therethrough. The flange 138 extends from the channel 126 to face, but not contact, the frame 34 of the sliding panel 28. As the chain 130 moves in the direction indicated by arrow A, the bracket 136 with the flange 138 moves as well.

In FIG. 4, another bracket assembly 142 is shown removably mounted to the frame 34 of the sliding panel 28. The bracket assembly 142 is adapted to be disengagingly coupled with the flange 138 extending from the channel 126. The bracket assembly 142 includes a base plate 144 on one side of which is disposed an adhesive material 146 for removably mounting the base plate 144 to the frame 34 of the sliding panel 28. Mounting of the base plate 144 does not require the frame 34 of the sliding panel 28 to be tapped or breached for insertion of screws, bolts or the like. A pair of spaced, L-shaped flanges 148,150 are secured by mechanical fasteners 152 to the base plate 144. The flanges 148,150 extend from the base plate 144 to face the side 124 of the horizontal housing 108. The space between the flanges 148,150 is substantially in registration with the channel 126 thereby permitting the flange 138 extending from the channel 126 to be received in the space between the L-shaped flanges 148,150. A surface of each one of the L-shaped flanges 148,150 faces the space therebetween and is provided with a layer of cushionable material 154 to reduce vibration and noise when the flange 138 is disposed between the L-shaped flanges 148,150. Apertures 156,158 extend through a corresponding one of the L-shaped flanges 148,150 and the cushionable material 154. The apertures are in registration with each other and come into registration with the aperture 140 of the flange 138 when it is disposed in the space between the L-shaped flanges 148,150. A pin 160 having a tapered end 162 and a handle portion 164 is inserted through the apertures 156,140,158 to disengagedly couple the flange 138 between the spaced L-shaped flanges 148,150. With this arrangement, the motion of the chain 130 to which the bracket 136 is attached is transmitted to the bracket assembly 142 and hence, the panel 28 to be slidably moved along the tracks 18,20 to open and close the passageway 42.

The adhesive material 146 for removably mounting the base plate 144 to the frame 34 of the sliding panel 28 does not require the frame 34 to be structurally altered. The adhesive material 146 is strong enough to retain the bracket assembly 142 to the frame 34 regardless of the speed at which the panel 28 is being moved to open or close the passageway.

Figure 4A:
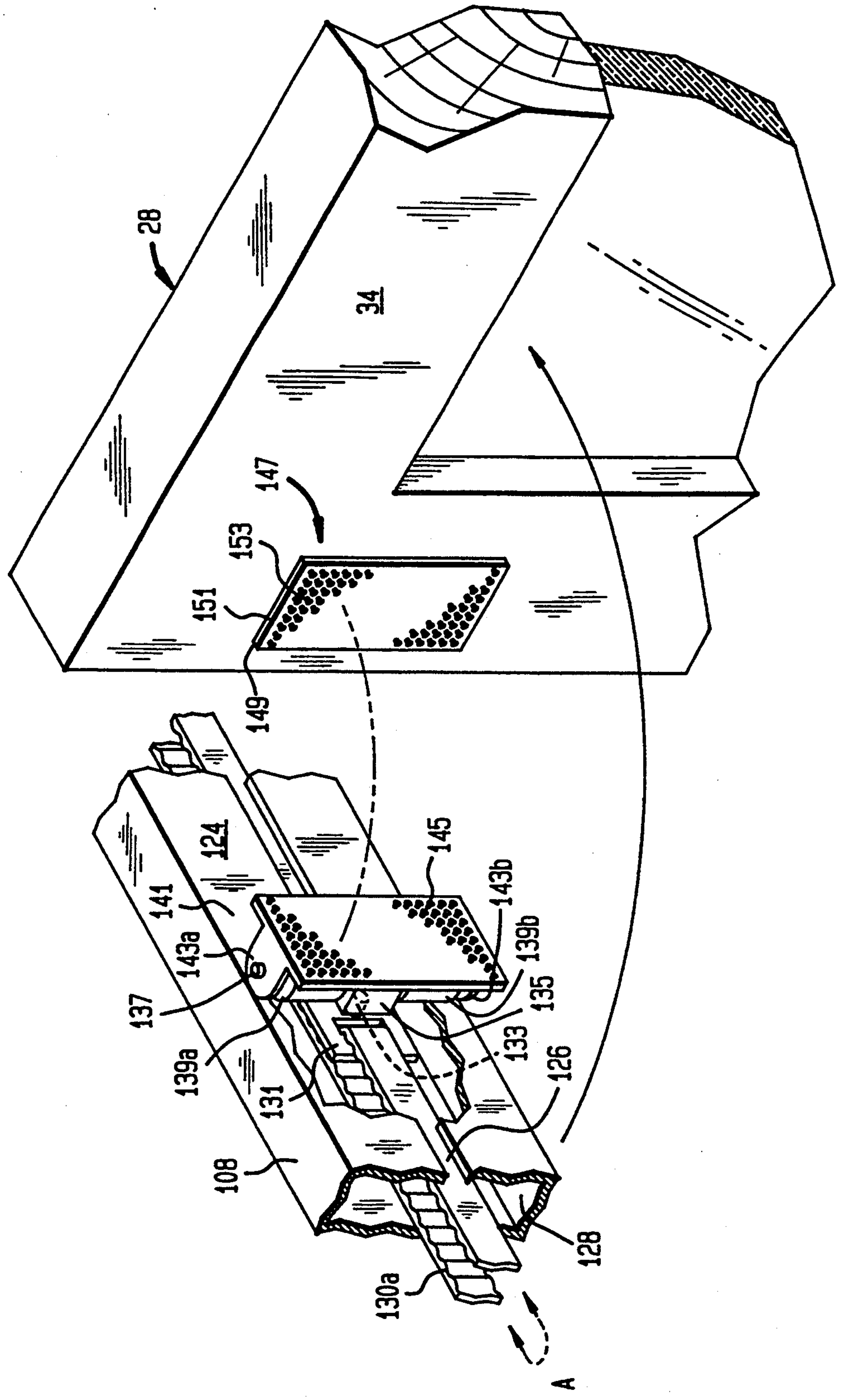
FIG. 4A is a perspective fragmentary view showing another embodiment of the means for disengagingly securing the automated actuator to the sliding door for activation.

In FIG. 4A an alternative mounting assembly is shown to removably mount the horizontal housing 108 to the frame 34 of the sliding panel 28. In this embodiment, arrangement of the horizontal housing 108 with respect to the sliding panel 28 is similar to that discussed with reference to FIG. 4. A continuous flexible belt **130*a* is used instead of the chain 130 and is disposed at the interior 128 of the horizontal housing 108. The belt 130*a* is driven and guided around pulleys 132,134 as shown in FIG. 2. The belt 130*a* forms a continuous loop and moves in the direction of arrow A'. A bracket 131 is secured to the belt 130*a* at the inside of the horizontal housing 108. A pair of posts 133 (only one of which is shown) extend from the bracket 131 through the channel 126 to be secured to a crossbar member 135 at the exterior of the horizontal housing 108 and facing the sliding panel 28. The crossbar 135 is disposed in parallel relationship with the channel 126. A pin or shaft member 137 extends through the crossbar 135 and is arranged perpendicular to the channel 126. A pair of rollers 139*a*,139*b* are mounted on the shaft member 137 in spaced relation at opposite sides of the crossbar 135. A U-shaped bracket 141 has side arms 143*a*,143*b* each of which is adapted to receive a corresponding end of the shaft member 137. A surface of the U-shaped bracket 141 faces the panel 28 and is provided with fastening means 145**, such as that distributed by the 3M Company under the trademark DUAL LOCK.

The flexibility of the belt **130*a* provides for play and freedom of movement of the bracket 131 which forces the U-shaped bracket 141 and crossbar 135 back against the horizontal housing 108. The rollers 139*a*,139*b* are provided to contact the side 124 of the horizontal housing 108 so that the belt 130*a* movement will not be impeded by unwanted friction at the side 124 of the housing 108**.

A coacting mounting assembly 147 is removably mounted to the sliding panel 28 for mating releasable engagement to the fastening means 145 of the U-shaped bracket 141. The mounting assembly 147 includes a base plate 149 along one side of which is disposed an adhesive material 151 for removably mounting the base plate 149 to the frame 34 of the sliding panel 28. A fastening means 153 is provided at the opposite side of the base plate 149 to face the fastening means 145 for releasable engagement thereto. With this arrangement, the motion of the belt **130*a* to which the bracket 131 is attached is transmitted to the U-shaped bracket 141 and hence to the panel 28 to be slidably moved along the tracks 18,20 to open and close the passageway 42**.

The adhesive material 151 has properties and advantages similar to those of the adhesive 146 discussed with reference to FIG. 4.

Figure 5:
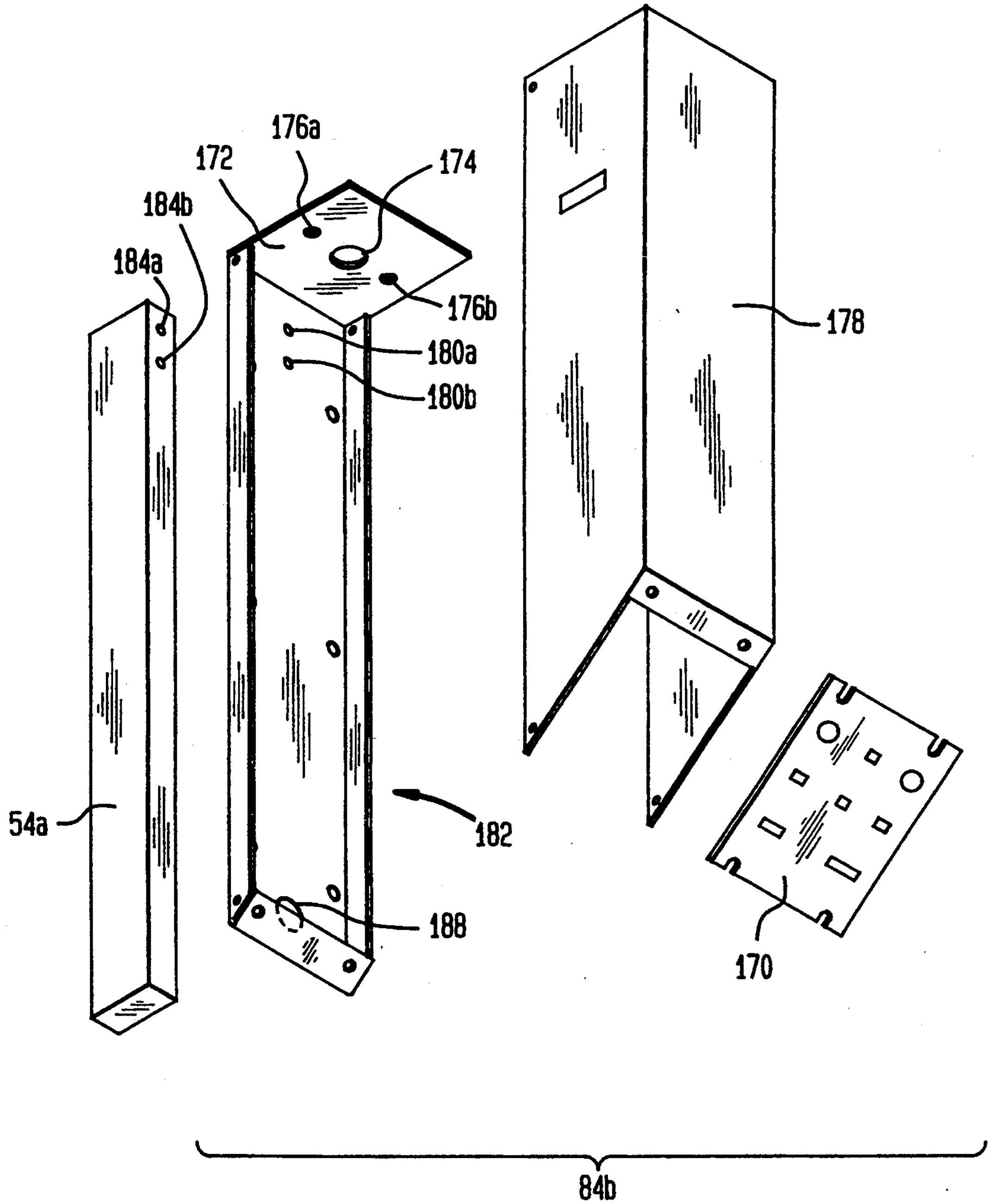
FIG. 5 is an exploded view of a third embodiment of a drive assembly housing for the automated actuator.

FIG. 5 shows another embodiment **84*b* of the motor housing and support column 54*a* for the actuator 10 of the present invention. The motor housing 84*b* is fabricated for attachment to the support column 54*a*. The motor housing 84*b* includes a control panel 170 which constitutes one end portion of a cover 178 for the motor housing 84*b*, or can be integral therewith. The control panel 170 is joined to the cover 178 so that the control panel 170 is sloped or angled to face the user. The slanted control panel facilitates ease of operation and monitoring of the controls for the motor and circuitry discussed hereinafter. The control panel 170 can also be used with the motor housings 84,84*a*. An end 172 for a base 182 of the motor housing 84*b* opposite the control panel 170 is provided with apertures therethrough. The central aperture 174 enables the motor shaft 104 of the motor 102 to extend from the motor housing 84*b* into the horizontal housing 108 to drive the chain 130 or belt 130*a*. Apertures 176*a*,176*b* are adapted for registration with corresponding apertures 114*a*,114*b*. Apertures 180*a*,180*b* of the housing are in registration with apertures 184*a*,184*b* on the support column 54*a* for mounting the housing to the support column. Aperture 188** is for a power cord (not shown).

Figure 6:
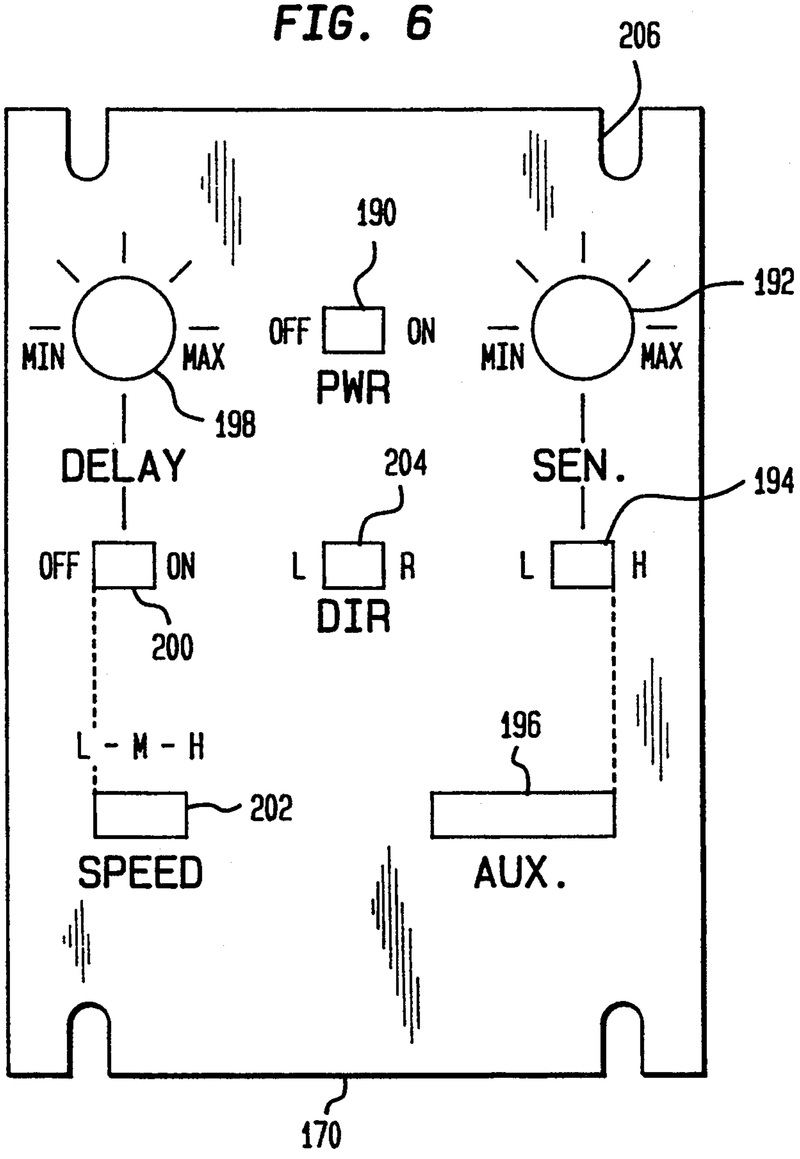
FIG. 6 is an elevational view of a control panel for the embodiments of the drive assembly housing shown in FIGS. 3, 3A

FIG. 6 shows the location and type of controls for the circuitry of the drive assembly. The control panel 170 includes a power switch 190 which is preferably of the toggle-type for ease of operation to turn the power ON/OFF to the actuator 10.

A sensitivity adjustment 192 SEN is employed to adjust the sensitivity of the circuitry to resistance that is encountered when the panel contacts an obstacle in its path along the line of travel. The sensitivity adjustment 192 includes a toggle switch 194 for light torque L and heavy torque H necessary to drive the panel 28, depending on the weight of the panel.

An auxiliary switch 196 AUX is provided when motion detection devices, pressure sensitive mats, voice announcements/audible alarms, etc. are used to actuate or indicate the status of the sliding panel.

A delay adjustment 198 DELAY is provided to close the sliding panel 28 after a select amount of time has elapsed since the panel was left open. The delay adjustment 198 is actuated by a toggle switch 200 when the switch has been moved to the ON position. When the toggle switch 200 is in the OFF position, the delay adjustment is disengaged and manual operation of the door is possible. As previously discussed, however, manual operation of the door is always available regardless of the position of the switch.

A speed adjustment 202 SPEED is provided which can be selected to move the sliding panel 28 at low L, medium M or high H speeds depending on how quickly the sliding panel 28 is to be moved to an open or closed position.

The direction switch 204 DIR is a toggle switch that is used to select the starting position of the sliding panel 28 with respect to the actuator 10. The starting position for the sliding panel 28 is that position where the panel has closed off the passageway 42. For example, when the switch is positioned to L (left), the sliding panel 28 is in the closed position at the left hand side of the door frame 16 when being viewed from the control panel 170. When the switch is shifted to R (right), the sliding panel 28 is in the closed position at the right side of the door frame 16 when being viewed from the control panel 170. The control panel 170 is provided with cut-out portions 206 for receiving mechanical fasteners (not shown) to join the control panel 170 to, for example, the motor housing **84*b***.

FIGS. 7, 8 and 9A–9H, show the steps employed and circuitry to control the automated actuator of the present invention. Circuit terminology for circuit components employed is shown in TABLE 1 and includes:

TABLE I

| Reference | Description | Value |
|---|---|---|
| C1, C2, C8 | CAP | 220 UF 16V RAD |
| C3, C4 | CAP | 10 UF 25V RAD |
| C5, C14, C15, C16 | CAP | .1 UF 50V RAD |
| C6, C10, C11, C12, C13 | CAP | 4.7 UF 16V RAD |
| C7 | CAP | 10 UF 25V RAD |
| C9 | CAP | 3300 UF 35V RAD |
| D1, D2, D3, D4, D5, D6, D7, D8, D9, D12, D13, D14, D15, D16, D17 | DIODE | 1N4005 |
| D10 | BRIDGE | 2A |
| D11 | DIODE ZENER | 12V |
| F1 | FUSE | 1.5 AMP |
| F2 | FUSE | 2.5 AMP |
| ISO1 | OPT. CPL | 4N25 |
| JP1, JP2, JP3 | HEADER 2 | 2 PIN |
| JP4 | HEADER 5 | 5 PIN |
| JP5 | HEADER 8 | 8 PIN |
| J1 | HEADER 13 × 2 | 13 PIN BY 2 |
| K1, K2 | RELAY DPDT | 12 V |
| Q1, Q2, Q3, Q4, Q5, Q6, Q7, Q8, Q9, Q10, Q11, Q12, Q13 | TRANSISTOR | NPN |
| R1, R7, R9, R10, R12, R13, R14, R15, R16, R17, R18, R19, R20, R24, R28, R29, R30, R38, R42, R43, R44 | RESISTOR | 10K |
| R2, R3, R45, R46, R47 | RESISTOR | 2.2K |
| R4, R23, R27 | RESISTOR | 22K |
| R5 | RESISTOR | 220K |
| R6 | RESISTOR | 470K |
| R8, R11 | RESISTOR | 1K |
| R21, R22 | RESISTOR | 4.7K |
| R25, R26, R31 | RESISTOR | 0 OHM |
| R32, R33 | RESISTOR | 4.7 |
| R34 | RESISTOR | 33K |
| R35 | RESISTOR | 1 OHM |
| R36 | RESISTOR | 16K |
| R37 | RESISTOR | 300 OHM |
| R39, R40, R41 | RESISTOR | 100K |
| U1, U2, U4 | TIMER | LM555 |
| U3 | COUNTER DEC | 4017 |
| U5 | OP AMP | LM358 |
| U6 | FLIP FLOP | 4013 |
| VRI | VOLT. REG. | 12V 3A |

TABLE I-continued

| Reference | Description | Value |
|---|---|---|
| MAIN PCB | PCB | |

Figure 7:
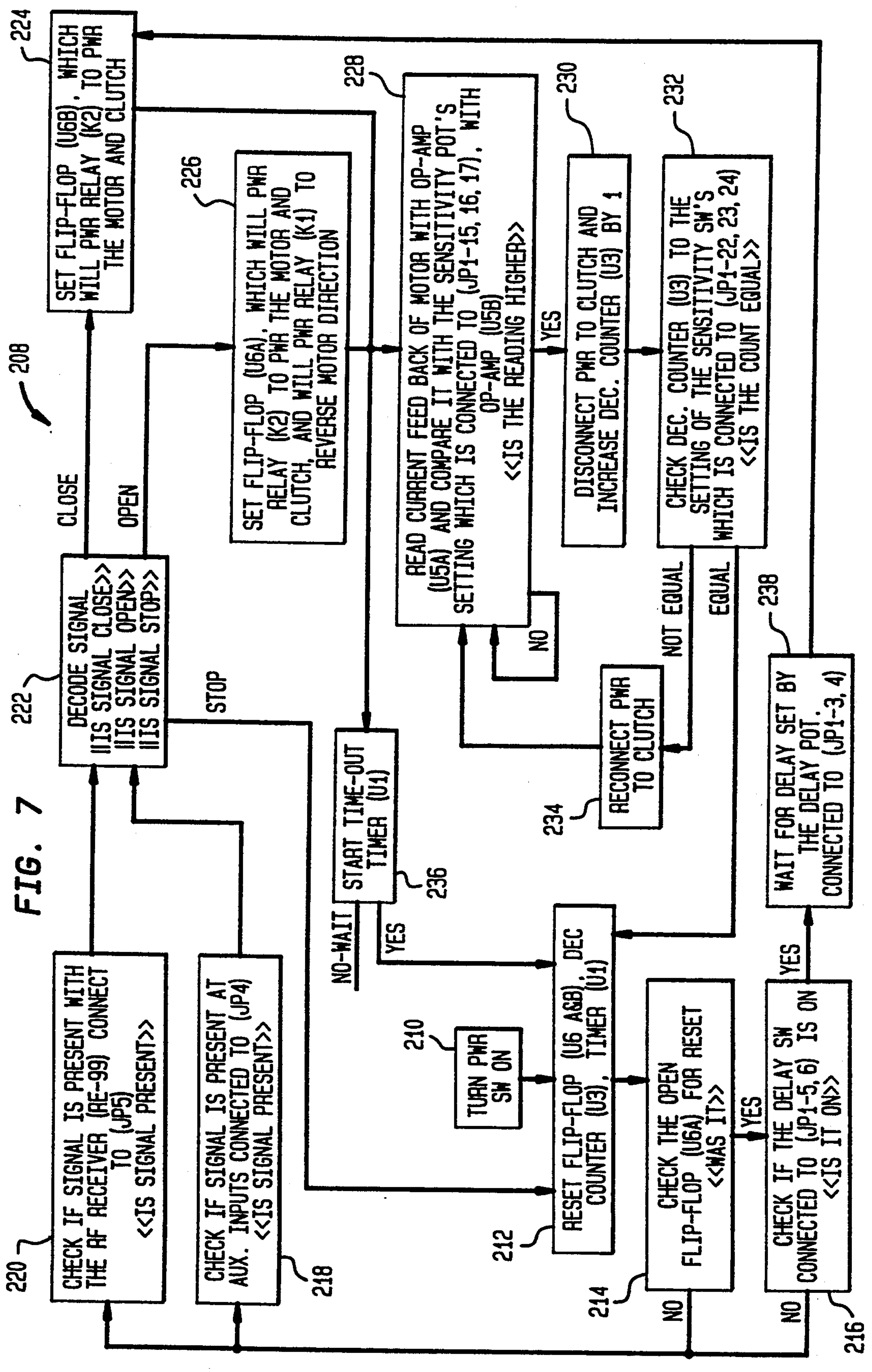
FIG. 7 is a flow chart of steps employed by circuitry to control the operation of the automated actuator.

Referring to FIG. 7, a flow chart 208 is shown which represents the interaction among the steps taken by the control circuitry of the actuator 10 to determine movement of the sliding panel 28. Initially, the power to the actuator 10 is OFF and the sliding panel 28 to be actuated is in the closed position against the right side of the door frame 16 to close the passageway 42. However, it is not necessary for the sliding panel 28 to be in the closed or open position for the actuator 10 of the present invention to be employed.

The interaction among the steps illustrated in the flow chart 216 includes the following events:

210 turn power switch on;

212 reset flip-flop, decade counter and timer;

214 check the open flip-flop for reset;

216 check if the delay switch connected to the JP header is on;

218 check if a signal is present at auxiliary inputs connected to the JP header;

220 check if a signal is present with the RF receiver;

222 decode signal to determine whether signal indicates "close", "open" or "stop";

224 set flip-flop which will power relay to power the motor and clutch;

226 set flip-flop which will power relay to power the motor and clutch, and will power relay to reverse motor direction;

228 read current feedback of motor and compare feedback with sensitivity setting;

230 disconnect power to clutch and increase decade counter;

232 check the decade counter to the setting of sensitivity;

234 reconnect power to clutch;

236 start time out timer; and 238 wait for delay set by the delay potentiometer.

The timer 236 automatically shuts off after a predetermined amount of time, preferably approximately seven seconds after the timer is activated. This is to allow for the situation where the sliding panel 28 contacts an object in the passageway 42 but the panel movement will not stop because the sensitivity is set at a level so high that resistive contact with the object is not recognized to warrant stopping the panel. Therefore, after seven seconds, the timer will automatically stop the panel movement. The circuitry checks 214 the open flip-flop for reset because if the panel is open then there is a delay for the door to be closed. The circuitry is also arranged to determine if the delay DELAY switch 216 is connected. If the delay is set, the sliding panel 28 would not move during the delay time period selected. If the delay period is selected, then the flip-flop would be set to power the motor and engage the clutch which would close the panel.

The current feedback 228 of the motor is read and compared with the sensitivity SEN selected. If the reading is higher than the sensitivity selected, power to the clutch to engage the motor is disconnected which results in the decade DEC counter being increased by one (1). The current is repeatedly checked to determine whether the current feedback from the motor is equal to or not equal to the sensitivity SEN selected. For example, if the sliding panel encountered and contacted an object blocking the passageway, e.g. an individual passing through the passageway, and the sliding panel was moving to the closed position, a pulse would be received which would indicate that the movement of the sliding door should be halted. Immediately thereafter, the current feedback from the motor, i.e. a pulse, would be checked to determine if the pulses were indicative of the sliding panel still in contact with the object. In this instance, with the individual passing through the passageway, the current feedback compared with the sensitivity selected would indicate that the obstruction, i.e. the individual, was no longer present at which time power to the clutch would be reconnected for movement of the sliding panel to the closed position. Checking the current feedback from the motor is done in fractions of a second to reduce the amount of delay or dwell time.

When the person or object remains in the passageway 42 and prevents the sliding panel from moving to the closed position, the current feedback will be continuously read 232 to determine if the object is immovable and accordingly, power to the motor and clutch will be disconnected. The count therefore is equal and again the reset stage 212 is set. The circuitry also checks the reset stage to see if the flip-flop circuit has been reset and if it has not, the circuitry checks to see if a signal is present from the RF receiver 220 or from the auxiliary AUX 218.

When a signal is present to actuate the panel it is decoded 222 to determine whether the signal is for the door to be closed, opened or for the door movement to be stopped. For example, if the signal is a CLOSE signal, the flip-flop circuit will be set to power the relay and in turn the motor and clutch to proceed as before. If the signal is an OPEN signal, the series of steps beginning at 226 would be initiated with the flip-flop circuit being set which will power the relay for the motor and clutch and power the relay to reverse the direction of the motor so that the sliding panel will open. The stages to read and check the signal with respect to the sensitivity SEN selected would begin again as before.

The time-out timer 236 is started to reset the flip-flop circuits after a period of time has elapsed. For example, when the sliding panel is opened or closed, the time-out timer 236 is initiated with a seven second delay. At the end of seven seconds, if there has been no signal to activate the panel, the circuitry is automatically disconnected. In another application, if for example the sliding panel 28 weighed very little yet the sensitivity SEN setting was set for a much heavier door, and the door contacted a person, the time-out timer would disconnect the circuitry after seven seconds so that unnecessary wear on the clutch and motor would be avoided.

Figure 8:
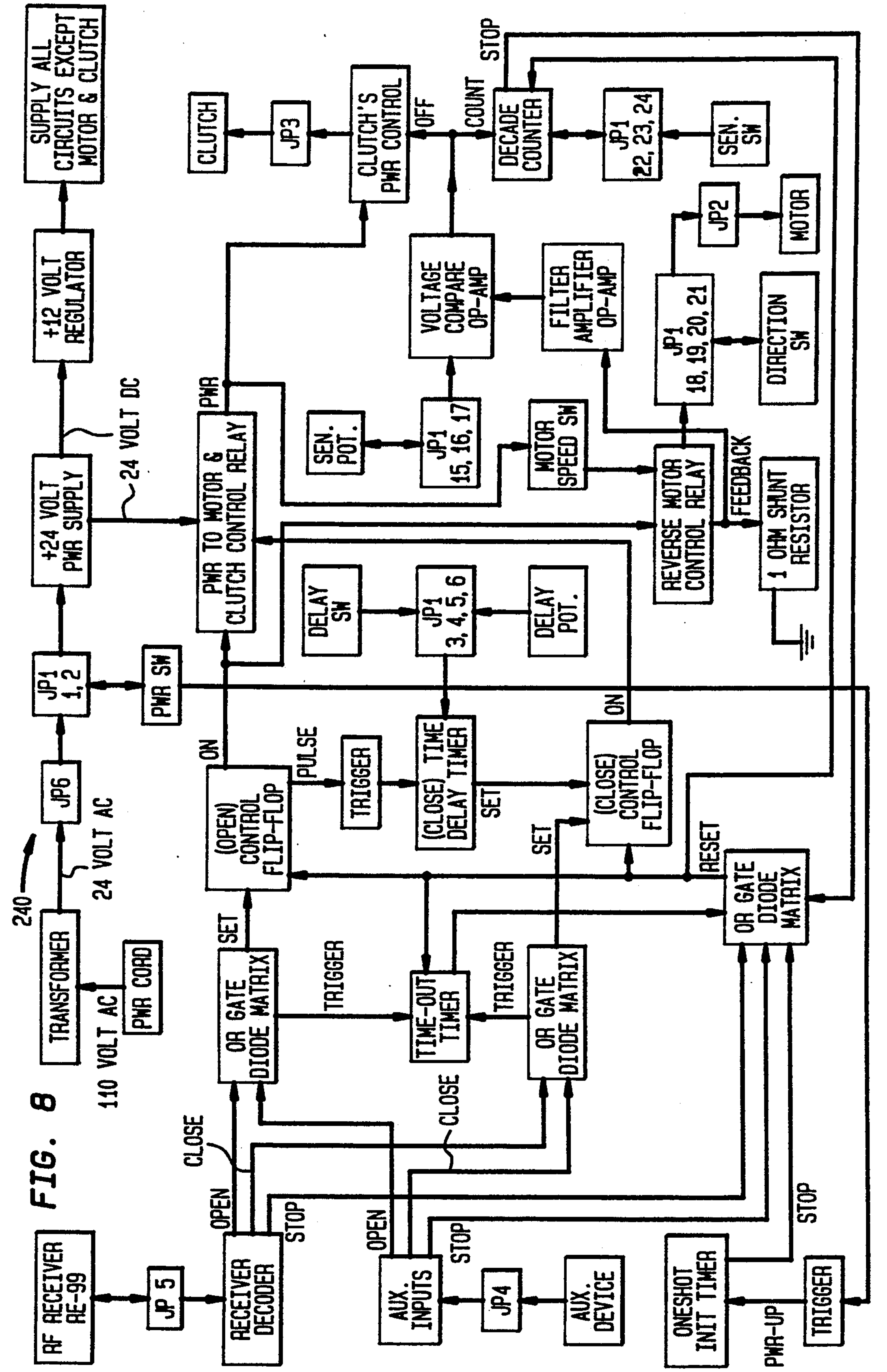
FIG. 8 is a block diagram of the circuitry elements used to control the operation of the automated actuator.
Figure 9A:
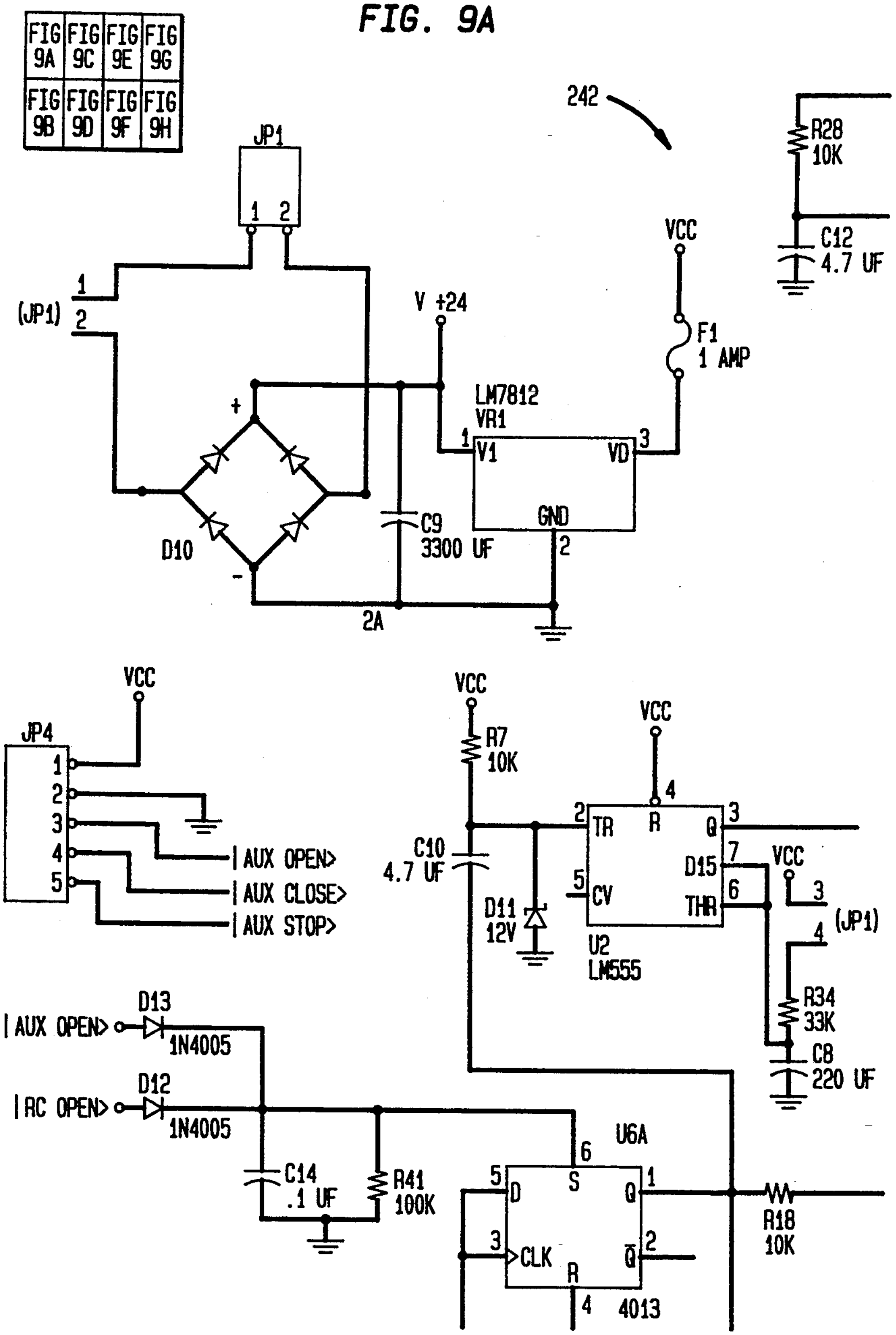
FIGS. 9A–9H effect a single complete view of a schematic wiring diagram of the circuitry elements shown in FIG. 8.
Figure 9B:
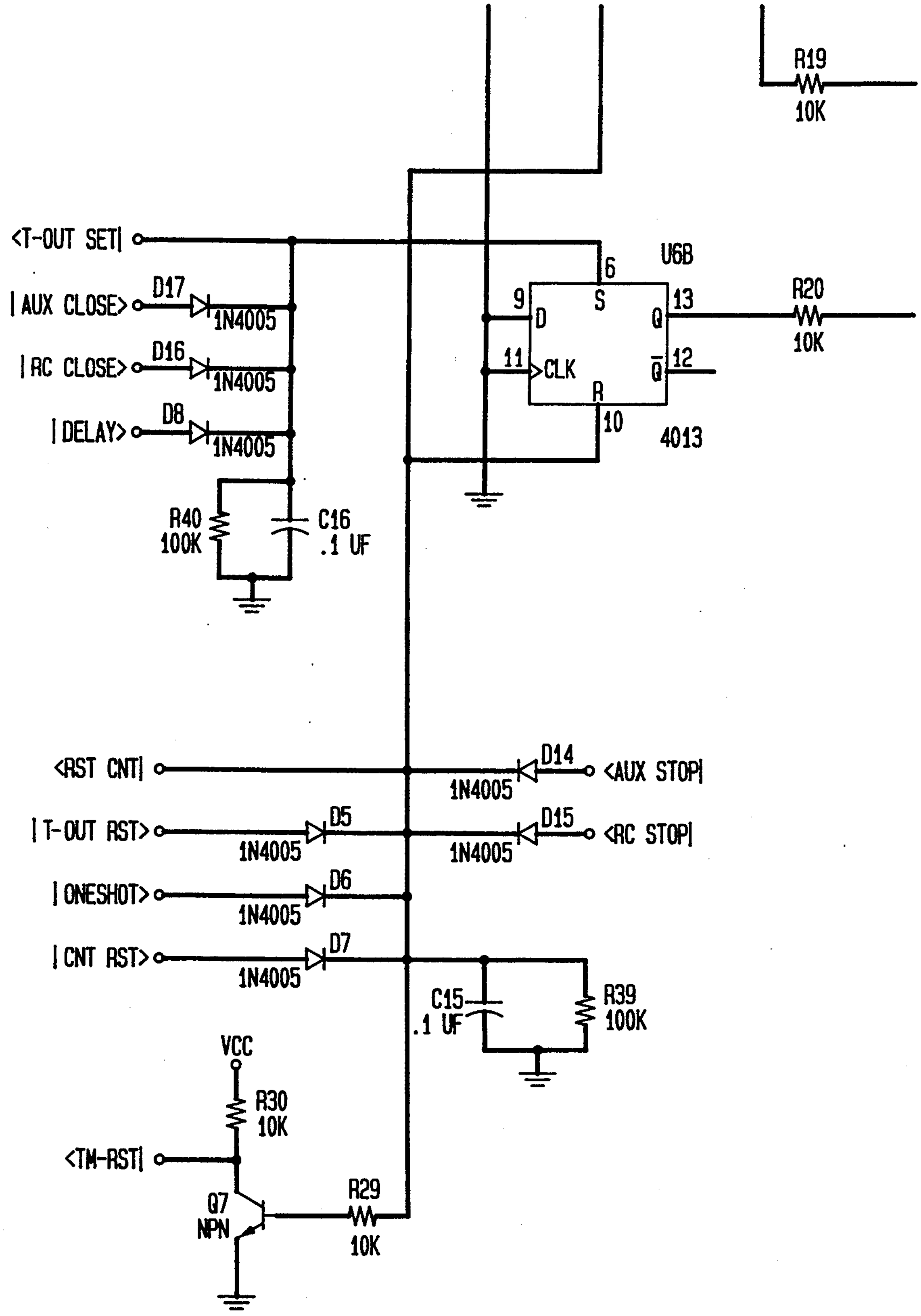
Figure 9C:
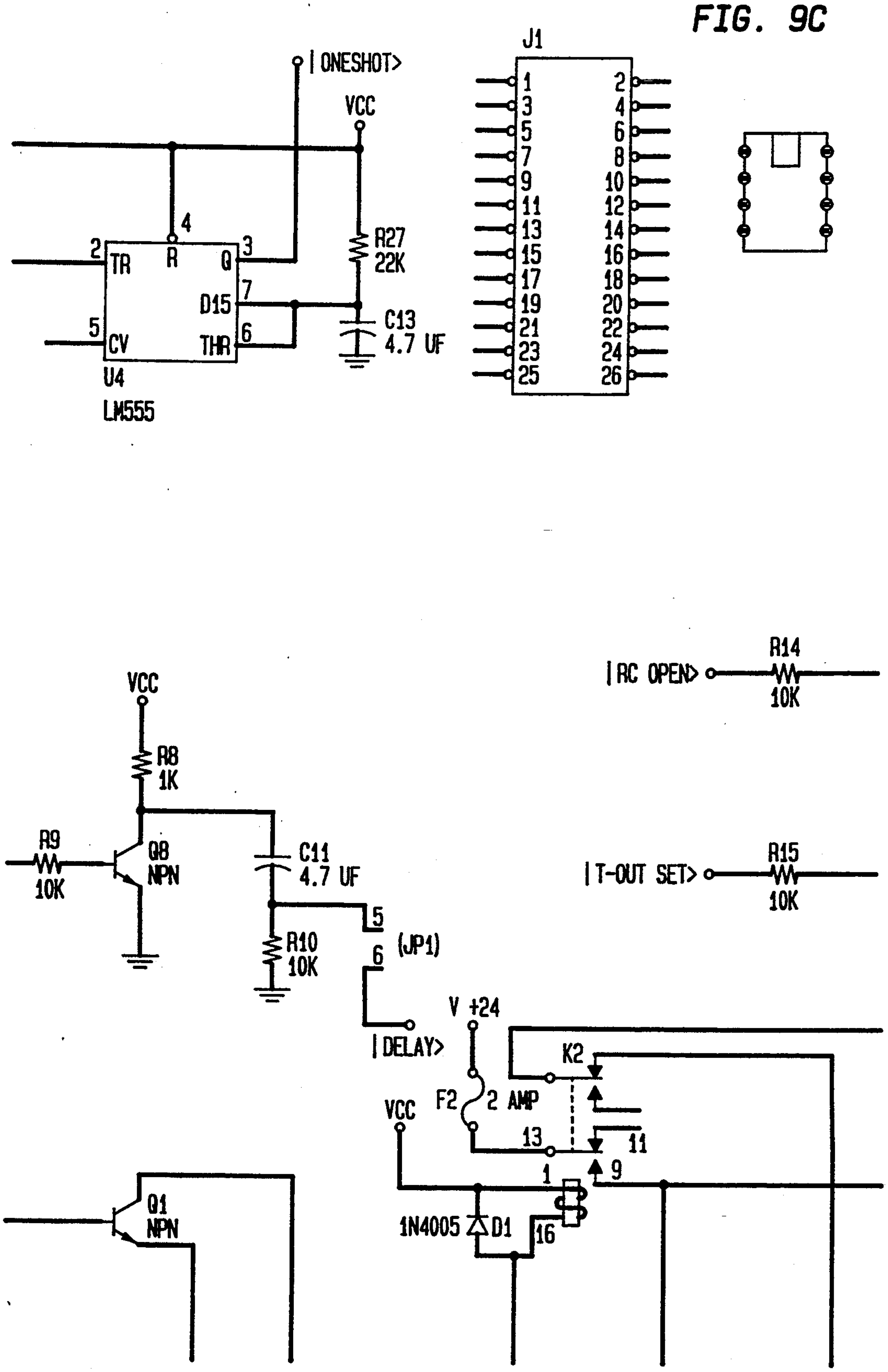
Figure 9D:
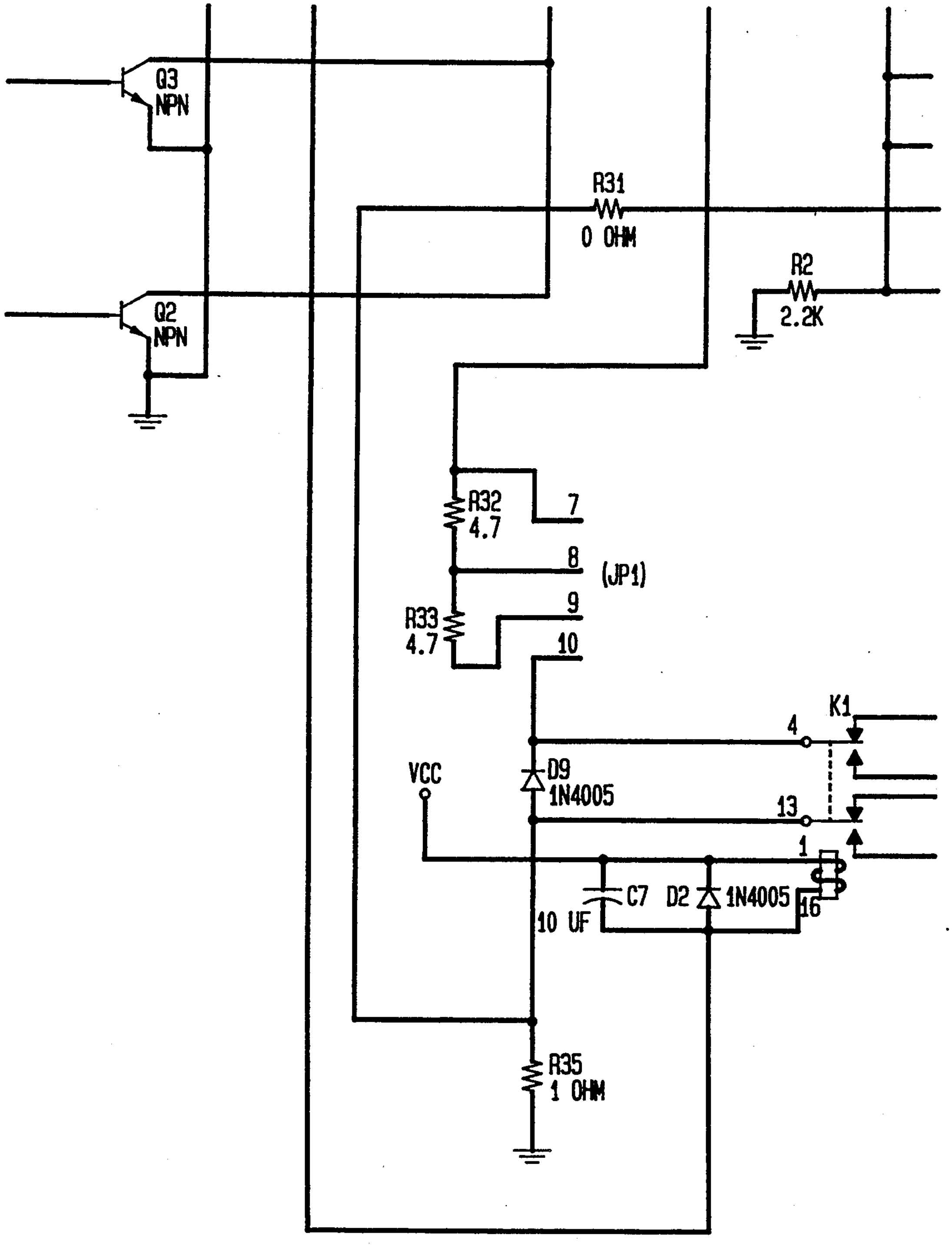
Figure 9E:
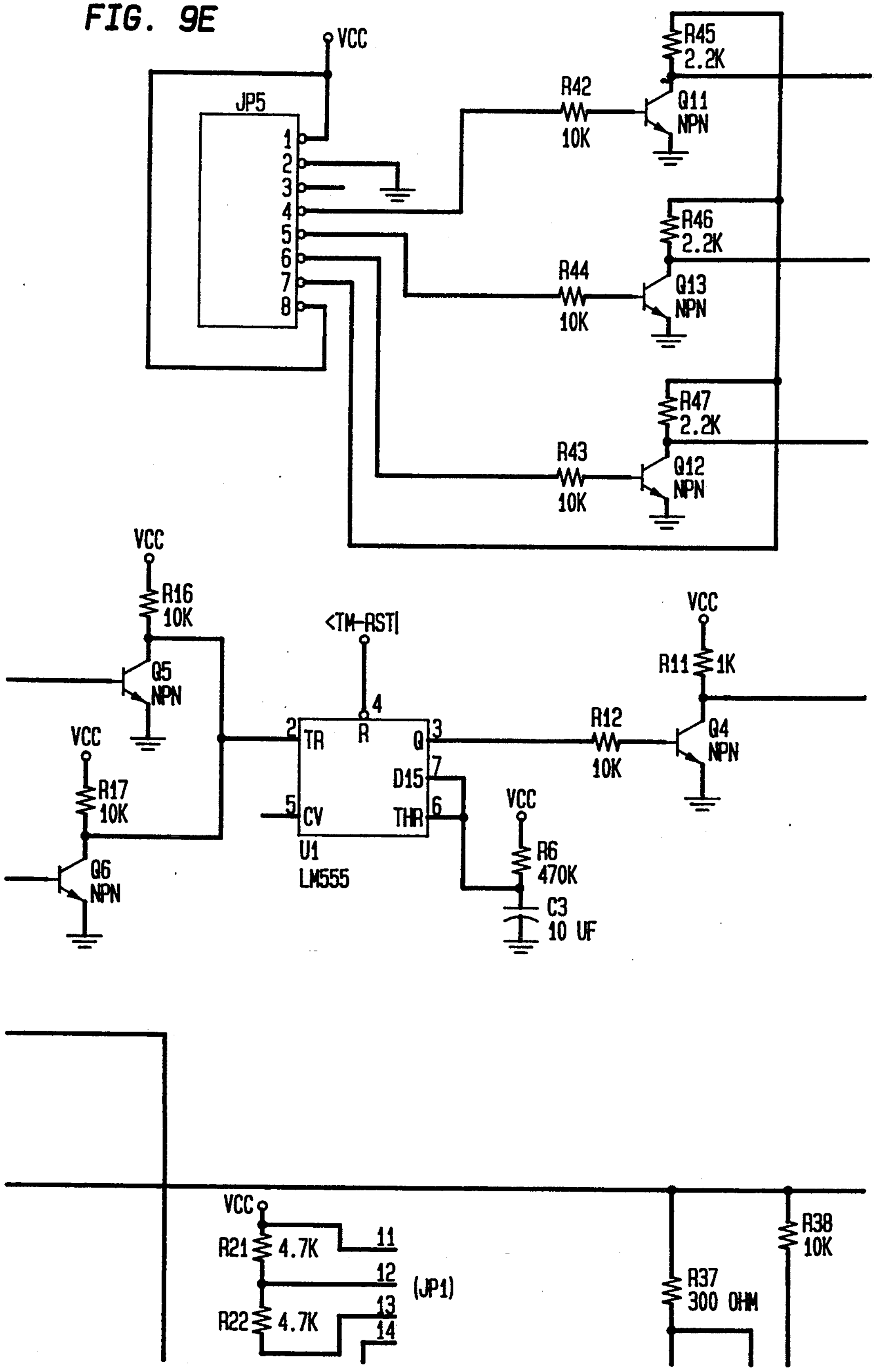
Figure 9F:
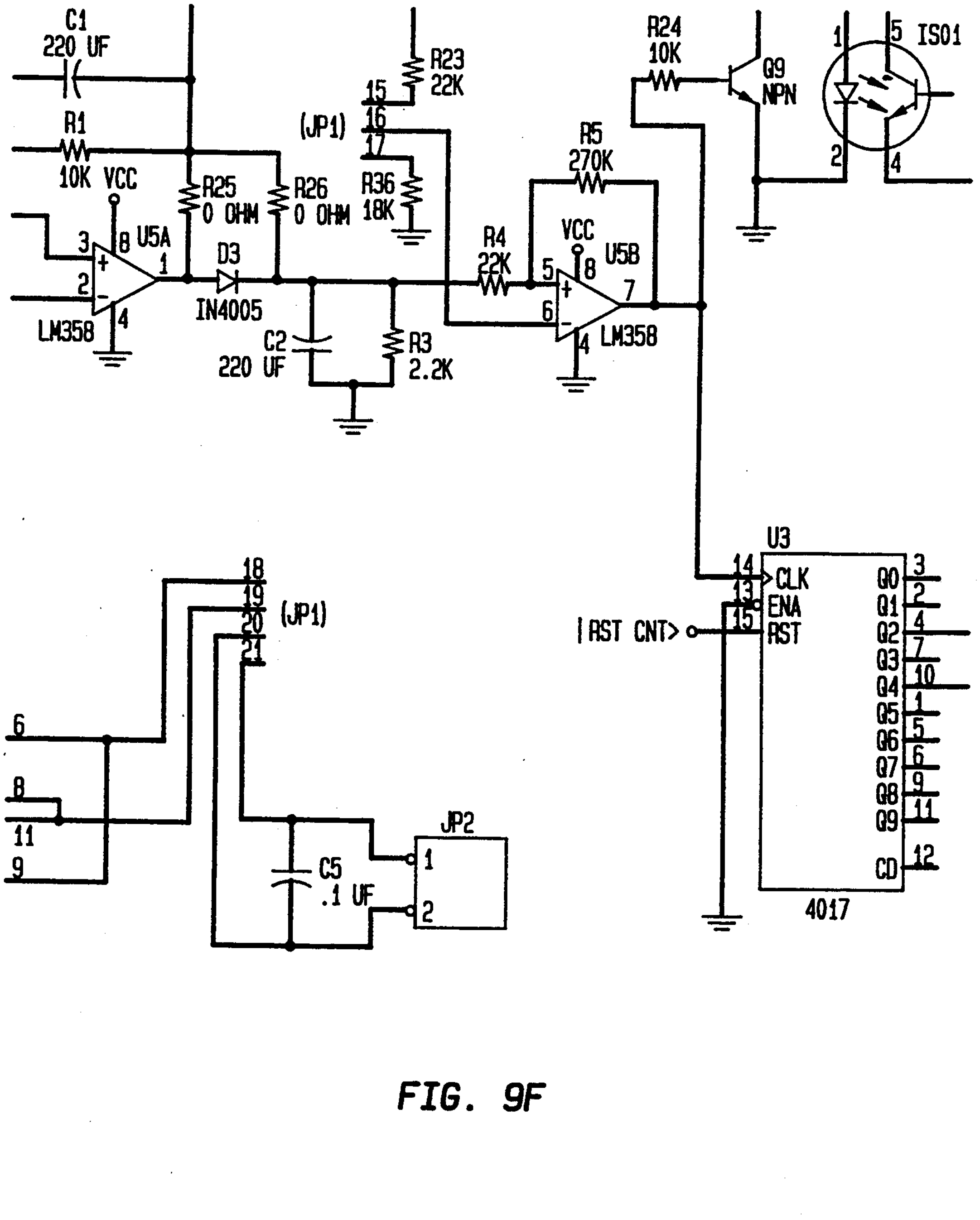
Figure 9G:
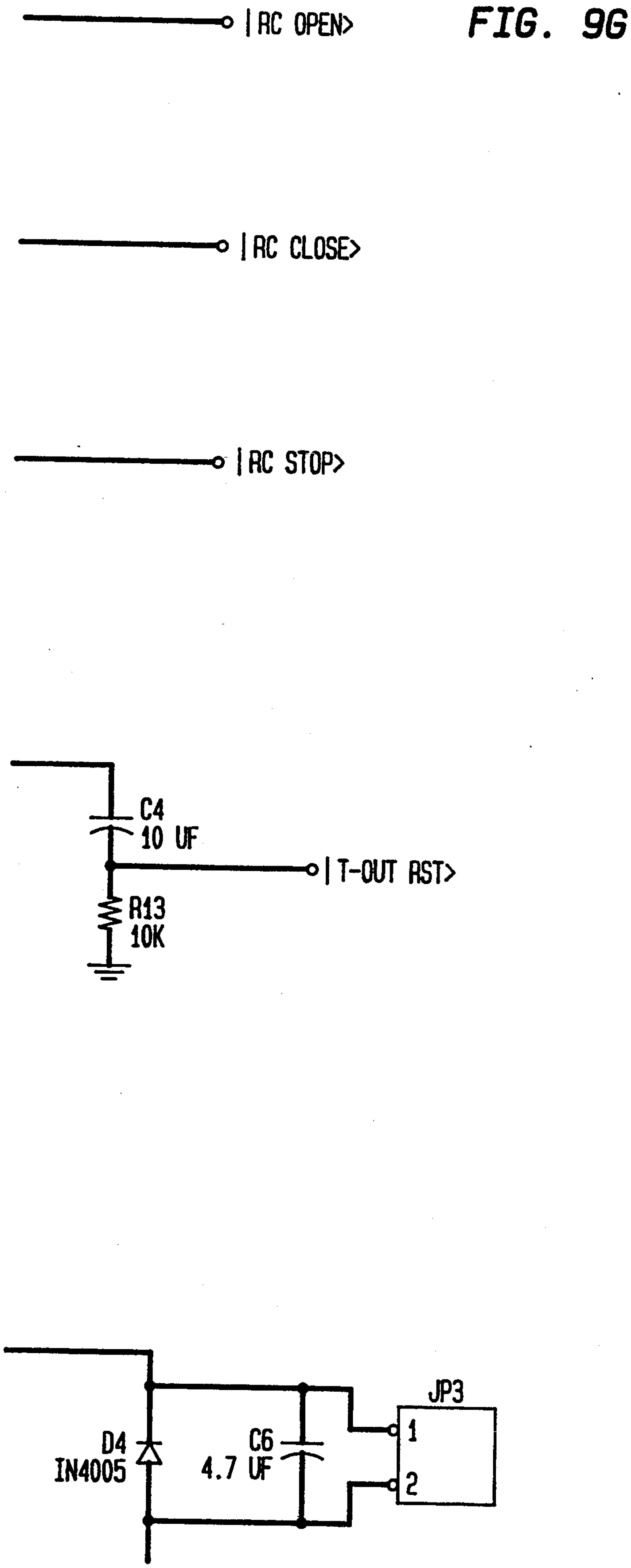
Figure 9H:
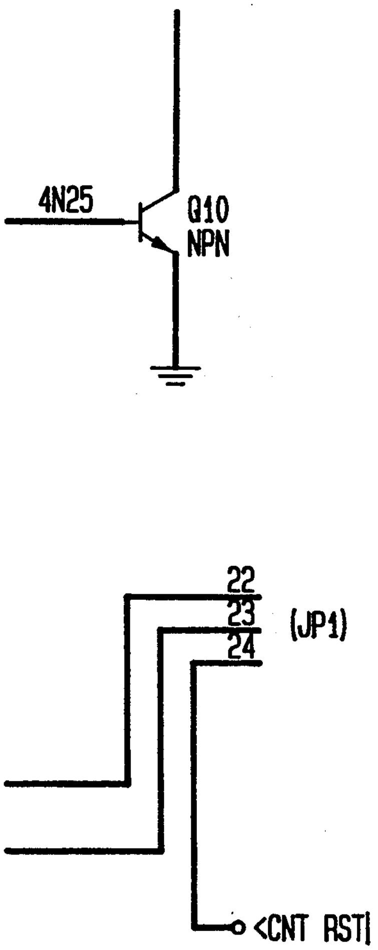

FIG. 8 is referred to in conjunction with FIGS. 9A-9H and shows a block diagram of a wiring arrangement 240 for the circuitry that enables the steps in FIG. 7 to be implemented. By way of example, the device employed to operate the actuator 10 of the present invention is an RF receiver, but it is understood that other devices can be employed, such as those discussed earlier with reference to FIG. 1.

In FIG. 8, the wiring arrangement 240 of the circuitry to control the actuator 10 is shown, as is the interaction among the components of the circuitry to move the sliding panel 28 between the open and closed positions at the door frame 16. The components of the circuitry 240 are labeled to correspond to the components listed in TABLE I and discussed with reference to FIG. 7.

FIGS. 9A–9H effect a wiring diagram 242 and the interconnection among the components of the circuitry for controlling the actuator 10 of the present invention. The components illustrated correspond to those listed in TABLE I and discussed with reference to FIG. 7.

In operation, the actuator 10 of the present invention is assembled from a kit and can be readily disassembled for storage and transport.

Referring again to FIGS. 1–3, to assemble the actuator 10 of the present invention, first determine if the sliding panel 28 to be actuated will be opened from left to right or right to left with respect to the control panel 170. Next, attach the horizontal housing 108 to the motor housing **84,84*a* being used by inserting the fasteners 116 through the corresponding apertures 114*a*,114*b* and 96*a*,96*b* (FIG. 3), 120*a*,120*b* (FIG. 3A) and tightening. The motor shaft 104 will be received in the aperture 118 of the horizontal housing 108. If the embodiment to be used includes the support column having a plurality of columnar sections 54*a*,54*b*, then join the sections together at the end 56 for engagement by a friction fit. Alternatively, the motor housing 84*b* (FIG. 5) can be permanently mounted to the support column 54. The lower support plate 64 is disposed in the lower track 20 and the upper support plate 76 is disposed in the upper track 18. The adjustment assembly 62 is manipulated so that the support column will fit snugly and securely against the door jamb 22 of the door frame 16. The actuator 10 is positioned at the door jamb 22 at the side of the door frame 16 opposite the sliding panel 28 when the panel is in the closed position. That is, as shown in FIG. 1 by way of example, the actuator 10 is positioned at the side of the door frame 16 so that the horizontal housing 108 extends to a position near the frame 34 of the sliding panel 28 that is to be moved between a close position and an open position. The sleeve 80 is then slid over the threaded portion of the stud 70 to conceal the stud and hex nut 72. The base plate 144 of the bracket assembly 142 is then secured by the adhesive material 146 to the frame 34 of the sliding panel 28 which is to be moved. The flange 138 of the bracket 136 is positioned in the space between the L-shaped flanges 148,150 so that the aperture 140 of the flange 138 is in registration with the apertures 156,158 of the L-shaped brackets 148,150. The pin 160 is inserted through the apertures 156,140,158 of the flanges 150,138,148, respectively, to disengagedly couple the chain bracket 136 to the bracket assembly 142 at the frame 34 of the sliding panel 28**.

It is understood that the sliding panel 28 can be moved by the coacting mounting assemblies shown and discussed with reference to FIG. 4A.

To actuate the door, the devices discussed with reference to FIG. 1 can be used. The wireless bump switches 48 are positioned at the inside and outside of the sliding panel 28. Alternatively, the motion sensor 50 and the proximity switch 52 can be used to activate the actuator 10. The actuator is then plugged into a wall switch and the power switch 190 at the control panel 170 turned on.

The clutch system of the present invention provides for manual operation of the panel whenever desired. In addition, the clutch system stops the panel when the panel meets with a resistance which exceeds the sensitivity selected so that, in particular, youngsters or elderly persons in the path of a closing door are not hurt. The clutch system stops the panel immediately upon impact with the person. The sensitivity adjustment is employed to control how quickly the panel must stop when it contacts an obstacle in its path.

The clutch system of the present invention checks signals from the drive means for resistance. This is a more accurate way of reacting to any resistance that the sliding panel meets during its movement along the track. When the circuitry senses that the motor is working against resistance, depending upon the sensitivity selected, the sliding panel will be stopped at the resistance. The clutch is disengaged permitting manual operation to move the panel from the stopped position to a different location.

The circuitry is also adapted to disengage the clutch of the drive assembly when the sliding panel meets resistance. The amount of resistance is tested by the circuitry to determine if the resistance met warrants disengaging the clutch. After the resistance is no longer present, the actuator is triggered to either open or close the panel as desired which enables the sliding panel to proceed along its intended direction as shown in FIG. 7.

The delay switch and adjustment therefore at the control panel 170, is beneficial in those instances where the sliding panel 28 is left completely open or slightly ajar. This feature of the invention permits the user to determine the amount of time that the panel should be left open before it is to be closed. This is particularly useful in situations where, for example, many people are using the passageway 42.

The actuator 10 of the present invention can also be employed with a pocket door 40. Pocket doors are preferred in homes and other buildings where doorways are constructed to permit passage of wheel chairs or other large equipment and objects. When used with pocket doors, the actuator 10 of the present invention can more easily be inserted in a recessed portion 38 of the wall 14 to actuate the pocket door because the actuator does not require intricate wiring or complex assembly in order to be operational.

Although the embodiments have been described with reference to sliding doors, it is understood that the actuator 10 of the present invention can be employed with sliding windows and other similar panels as well. In addition, the actuator is adapted to be mounted to actuate panels for vertical movement.

The actuator 10 can be disassembled and stored in one or two boxes. That is, the support column 54 can be broken down to be stored with the horizontal housing 108 in one box, while the motor housing 84 and other hardware is stored in a separate box. Of course, in the embodiment where the motor housing **84*b* is attached to the support column 54**, the support column and motor housing would be stored together.

It will be understood that the embodiments described herein are merely exemplary and that persons skilled in the art may make many variations and modifications without departing from the spirit and scope of the invention. All such modifications and variations are intended to be included within the scope of the invention as defined in the appended claims.

What is claimed is:

1. An apparatus for actuating a panel slidably mounted to control access through a passageway, the apparatus comprising:

a support member having a first end and a second end;

a first assembly removably mounted to the first end of the support member and adapted to adjust the length of the support member for being braced at a side of the passageway;

a second assembly removably mounted to the support member and including a drive mechanism;

a third assembly removably mounted to the second end of the support member and adapted to move the panel between an open and close position to control access through the passageway, the third assembly having opposed end portions and an endless flexible member, one of the opposed end portions adapted to be removably mounted to and in registration with the drive mechanism of the second assembly for the drive mechanism to engage the endless flexible member, the other one of the opposed end portions extending to a position adjacent the panel to be actuated and;

a coupling assembly for disengagingly coupling the third assembly to the panel, the coupling assembly including a first coupling member mounted to the endless flexible member of the third assembly, and a second coupling member removably mounted to the panel, the first and second coupling members adapted for releasable engagement with each other.

2. The apparatus according to claim 1, wherein the support member includes a plurality of columnar sections having end portions sized and shaped for releasable engagement with each other.

3. The apparatus according to claim 1, wherein the first assembly includes:

a support block adapted to brace the support member, a threaded member extending from the support block and adapted to be received in the first end of the support member, and an adjusting member adapted to be moved along the threaded member to a select position on the threaded member, wherein the first end of the support member abuts the adjusting member and any portion of the threaded member extending from the adjusting member is received in the first end of the support member, whereby the length of the support member is adjusted to brace the support member at a side of the passageway.

4. The apparatus according to claim 1, further including an engaging member for releasably engaging the first coupling member to the second coupling member.

5. The apparatus according to claim 1, wherein the first coupling member includes a first bracket, the first bracket having a first flange extending from the third assembly, the first flange having a first aperture extending therethrough, and the second coupling member includes a first surface and a second surface, the first surface including a second flange having a second aperture extending therethrough and a third flange having a third aperture extending therethrough, the second and third flanges of the second coupling member being spaced apart with the second and third apertures being in registration with each other, the second surface having an adhesive fastener disposed thereon for releasable engagement with the panel.

6. The apparatus according to claim 5, wherein the first flange of the first bracket is sized and shaped to be disposed between the second flange and the third flange of the second bracket, the first, second and third apertures in registration with each other.

7. The apparatus according to claim 6, further including a pin member sized and shaped to be removably inserted into the first, second and third apertures for releasably coupling the first flange of the first bracket between the second and third flanges of the second bracket.

8. The apparatus according to claim 1, wherein the first coupling member mounted to the endless flexible member of the third assembly comprises:

a crossbar member;

a shaft member having opposed ends and extending through the crossbar member;

a pair of rollers disposed on the shaft member for rotational movement and spaced apart at opposite sides of the crossbar member; and a U-shaped bracket having opposed ends turned inward, each one of the opposed ends adapted to receive a corresponding one of the opposed ends of the shaft member, and a first surface facing the panel, the first surface having fastening material disposed thereon;

and the second coupling member includes a base plate having a first surface with a fastening material adapted for mating engagement with the fastening material disposed on the U-shaped bracket, and a second surface having an adhesive disposed thereon for releasable engagement with the panel.

9. The apparatus according to claim 1, wherein the third assembly is adapted to be flipped over for the end portion to be maintained in registration with the drive mechanism and permit the other end portion of the third assembly to extend in an opposite direction.

10. The apparatus according to claim 1, further including a wireless transmission signal device to actuate the apparatus.

11. The apparatus according to claim 1, further including pressure sensitive contact switches adapted for wireless transmission of signals to actuate the apparatus.

12. The apparatus according to claim 1, further including a proximity switch adapted to actuate the apparatus.

13. The apparatus according to claim 1, further including a motion detection device to actuate the apparatus.

14. The apparatus according to claim 1, wherein the endless flexible member is a belt.

15. The apparatus according to claim 1, wherein the second assembly includes a housing in which is disposed the drive mechanism, the drive mechanism housing adapted to permit a portion of the drive mechanism to extend therefrom for engagement with the endless flexible member, and the third assembly includes a housing in which is disposed the endless flexible member, the flexible member housing having a channel extending lengthwise along the flexible member housing to an interior of the housing, the channel disposed to face the panel, the first coupling member extending from the channel.

16. The apparatus according to claim 1, further including a fifth assembly removably mounted to the second end of the support member, the fifth assembly adapted to brace the second end of the support member at a side of the passageway.

17. The apparatus according to claim 1, further including circuitry means for controlling actuation of the apparatus, the circuitry means adapted to evaluate and respond to a resistive force encountered by the panel to control movement of the panel at the passageway.

18. The apparatus according to claim 17, wherein the circuitry means is adapted to monitor the resistive force encountered by the panel, wherein upon removal of the resistant force the circuitry means transmits a signal to move the panel to control access through the passageway.

19. The apparatus according to claim 17, further including a clutch mechanism, the clutch mechanism adapted to engage the drive mechanism of the apparatus, the circuitry means adapted to control the clutch mechanism.

20. The apparatus according to claim 19, wherein the circuitry means includes a timer to disable the apparatus after a select amount of time has elapsed without the panel being moved.

21. The apparatus according to claim 1, wherein the panel is a door.

22. The apparatus according to claim 1, wherein the panel is a window.

23. An apparatus for actuating a panel slidably mounted between a first track and a second track to open and close a passageway, the apparatus comprising:

a support column having an upper end and a lower end;

an adjustment assembly removably mounted to the lower end of the support column for adjusting the length of the support column, the adjustment assembly adapted to be disposed in the first track to brace the support column to one side of the passageway;

a positioning member removably mounted to the upper end of the support column, the positioning member adapted to be disposed in the second track;

a first housing removably mounted to the support column, the first housing having a drive assembly disposed therein;

a second housing having opposed ends, one of the opposed ends adapted for being removably mounted at the upper end of the support column and for being in registration with the first housing, wherein the other of the opposed ends extends to a position adjacent the panel to be actuated, the second housing including:

a channel extending lengthwise along the second housing to an interior of the second housing, the channel facing the panel, an endless flexible member disposed for movement within the second housing, the endless flexible member adapted to be moved by the drive assembly of the first housing, a first engaging member mounted to the flexible continuous member and extending through the channel to face the panel; and a second engaging member removably mounted to the panel to releasably engage the first engaging member extending from the channel of the second housing.

24. The apparatus according to claim 23, further including a clutch mechanism and circuitry means, the circuitry means interconnecting the clutch mechanism and the drive assembly and being responsive to resistive force encountered by the panel to control the clutch mechanism and the drive assembly so that the panel can be moved between the open and close position.

* * * * *